(12) United States Patent
Langerbeins et al.

(10) Patent No.: US 12,540,211 B2
(45) Date of Patent: Feb. 3, 2026

(54) COMPOSITION AND PROCESS FOR PRODUCING SILYLATED POLYMERS AND USE THEREOF

(71) Applicant: PolyU GmbH, Oberhausen (DE)

(72) Inventors: Klaus Langerbeins, Oberhausen (DE); Michael Senzlober, Oberhausen (DE)

(73) Assignee: PolyU GmbH, Oberhausen (DE)

( * ) Notice: Subject to any disclaimer, the term of this patent is extended or adjusted under 35 U.S.C. 154(b) by 873 days.

(21) Appl. No.: 17/439,508

(22) PCT Filed: Mar. 20, 2020

(86) PCT No.: PCT/EP2020/057864
§ 371 (c)(1),
(2) Date: Sep. 15, 2021

(87) PCT Pub. No.: WO2020/193430
PCT Pub. Date: Oct. 1, 2020

(65) Prior Publication Data
US 2022/0259365 A1     Aug. 18, 2022

(30) Foreign Application Priority Data

Mar. 26, 2019 (EP) .................................. 19165363
Aug. 12, 2019 (EP) .................................. 19191328

(51) Int. Cl.
| | |
|---|---|
| *C08G 18/16* | (2006.01) |
| *C08G 18/08* | (2006.01) |
| *C08G 18/10* | (2006.01) |
| *C08G 18/18* | (2006.01) |
| *C08G 18/20* | (2006.01) |
| *C08G 18/22* | (2006.01) |
| *C08G 18/24* | (2006.01) |
| *C08G 18/28* | (2006.01) |
| *C08G 18/30* | (2006.01) |
| *C08G 18/46* | (2006.01) |
| *C08G 18/48* | (2006.01) |
| *C08G 18/71* | (2006.01) |
| *C08G 18/75* | (2006.01) |
| *C08G 18/76* | (2006.01) |
| *C08G 18/77* | (2006.01) |
| *C08G 18/78* | (2006.01) |
| *C08G 18/79* | (2006.01) |
| *C08G 77/04* | (2006.01) |
| *C08L 75/04* | (2006.01) |
| *C08G 101/00* | (2006.01) |

(52) U.S. Cl.
CPC .......... *C08G 18/163* (2013.01); *C08G 18/10* (2013.01); *C08G 18/14* (2013.01); *C08G 18/1808* (2013.01); *C08G 18/2018* (2013.01); *C08G 18/2081* (2013.01); *C08G 18/222* (2013.01); *C08G 18/246* (2013.01); *C08G 18/2865* (2013.01); *C08G 18/289* (2013.01); *C08G 18/307* (2013.01); *C08G 18/4615* (2013.01); *C08G 18/4825* (2013.01); *C08G 18/4829* (2013.01); *C08G 18/718* (2013.01); *C08G 18/755* (2013.01); *C08G 18/7671* (2013.01); *C08G 18/778* (2013.01); *C08G 18/785* (2013.01); *C08G 18/792* (2013.01); *C08G 77/045* (2013.01); *C08L 75/04* (2013.01); *C08G 2101/00* (2013.01); *C08G 2110/0008* (2021.01); *C08G 2110/0025* (2021.01); *C08G 2110/0083* (2021.01); *C08G 2150/00* (2013.01); *C08G 2150/60* (2013.01); *C08G 2170/00* (2013.01); *C08G 2170/60* (2013.01); *C08G 2190/00* (2013.01); *C08L 2312/08* (2013.01)

(58) Field of Classification Search
CPC .............................. C08G 77/08; C08G 18/163
See application file for complete search history.

(56) References Cited

U.S. PATENT DOCUMENTS

| | | | |
|---|---|---|---|
| 4,798,878 A | 1/1989 | Brinkmann et al. | |
| 5,998,504 A | 12/1999 | Groth et al. | |
| 7,737,228 B2 | 6/2010 | Lichtenhan et al. | |
| 9,156,981 B2* | 10/2015 | Lim ....................... | C08L 75/04 |
| 2003/0055193 A1 | 3/2003 | Lichtenhan et al. | |
| 2004/0024212 A1 | 2/2004 | Bernard et al. | |
| 2007/0055010 A1 | 3/2007 | Ludewig et al. | |
| 2009/0082502 A1 | 3/2009 | Lichtenhan et al. | |
| 2010/0125123 A1* | 5/2010 | Lichtenhan ......... | C23C 18/1233 |
| | | | 525/453 |
| 2012/0264840 A1 | 10/2012 | Klein et al. | |

(Continued)

FOREIGN PATENT DOCUMENTS

| | | |
|---|---|---|
| CA | 3 150 038 A1 | 2/2021 |
| CN | 1909978 A | 2/2007 |

(Continued)

OTHER PUBLICATIONS

International Search Report dated Dec. 2, 2021 issued by the International Searching Authority in PCT/EP2021/072543.

(Continued)

*Primary Examiner* — Margaret G Moore
(74) *Attorney, Agent, or Firm* — Sughrue Mion, PLLC

(57) ABSTRACT

The invention relates to a composition comprising and to a process for preparing moisture-crosslinking polymers under catalysis by a metal-siloxane-silanol(ate) compound, and to the use of the composition in the CASE sector (coatings, adhesives, sealants and elastomers), especially in the field of adhesives and sealants.

15 Claims, No Drawings

(56) References Cited

U.S. PATENT DOCUMENTS

| | | | |
|---|---|---|---|
| 2016/0046793 A1* | 2/2016 | Phanopoulos | C08K 5/549 524/398 |
| 2016/0264708 A1 | 9/2016 | Klein et al. | |
| 2017/0198084 A1 | 7/2017 | Holvoet et al. | |
| 2020/0115503 A1 | 4/2020 | Langerbeins et al. | |
| 2022/0235169 A1 | 7/2022 | Langerbeins et al. | |
| 2022/0235171 A1 | 7/2022 | Langerbeins et al. | |
| 2022/0372285 A1 | 11/2022 | Langerbeins et al. | |
| 2023/0272147 A1 | 8/2023 | Langerbeins et al. | |

FOREIGN PATENT DOCUMENTS

| | | | |
|---|---|---|---|
| CN | 101253209 A | 8/2008 | |
| CN | 101253210 A | 8/2008 | |
| CN | 102639584 A | 8/2012 | |
| CN | 102781994 A | 11/2012 | |
| CN | 104194708 A | 12/2014 | |
| CN | 105308109 A | 2/2016 | |
| CN | 105793327 A | 7/2016 | |
| CN | 105829377 A | 8/2016 | |
| CN | 106459362 A | 2/2017 | |
| DE | 102007037641 A1 | 3/2008 | |
| EP | 1 924 623 A1 | 5/2008 | |
| EP | 2 468 759 A1 | 6/2012 | |
| EP | 2 546 278 A2 | 1/2013 | |
| EP | 2865704 A1 | 4/2015 | |
| EP | 3 392 313 A1 | 10/2018 | |
| EP | 3613785 A1 | 2/2020 | |
| EP | 3 715 396 A1 | 9/2020 | |
| EP | 3715397 A1 | 9/2020 | |
| EP | 4 013 802 | 6/2022 | |
| JP | 2007-523968 A | 8/2007 | |
| JP | 2009-507087 A | 2/2009 | |
| JP | 2009-510229 A | 3/2009 | |
| JP | 2016-516865 A | 6/2016 | |
| JP | 2020-517771 A | 6/2020 | |
| JP | 2022-525266 A | 5/2022 | |
| TW | 200909462 A | 3/2001 | |
| WO | 99/48942 A1 | 9/1999 | |
| WO | 2007/025667 A1 | 3/2007 | |
| WO | 2008/144735 A1 | 11/2008 | |
| WO | 2009/065873 A2 | 5/2009 | |
| WO | 2009/130297 A2 | 10/2009 | |
| WO | 2010/022388 A2 | 2/2010 | |
| WO | 2012/136657 A1 | 10/2012 | |
| WO | 2015/032717 A1 | 3/2015 | |
| WO | 2017/064139 A1 | 4/2017 | |
| WO | 2018/158389 A1 | 9/2018 | |
| WO | 2020/193430 A1 | 10/2020 | |
| WO | 2021/028511 A1 | 2/2021 | |

OTHER PUBLICATIONS

Office Action issued Mar. 4, 2024 in Canadian Application No. 3,150,038.
Office Action issued Mar. 11, 2024 in Canadian Application No. 3,133,585.
Office Action issued Mar. 12, 2024 in Japanese Application No. 2022-502323.
International Search Report for PCT/EP2020/057864, dated May 20, 2020 [PCT/ISA/210].
Chinese Office Action dated Jul. 20, 2023 in Chinese Application No. 202080065973.7.
Communication dated Mar. 12, 2023 from the State Intellectual Property Office of P.R. of China in Application No. 202080021392.3.
International Search Report for PCT/EP2020/057868, dated Jun. 9, 2020 [PCT/ISA/210].
International Search Report for PCT/EP2020/072688 dated Nov. 6, 2020 [PCT/ISA/210].
International Search Report of PCT/EP2020/057877 dated Jun. 9, 2020 [PCT/ISA/210].
English translation of Office Action issued Aug. 21, 2024 (drafted Aug. 15, 2024) in Japanese Application No. 2022-507410.
Office Action issued Aug. 26, 2024 in U.S. Appl. No. 17/633,212.
Office Action issued Jul. 3, 2024 in U.S. Appl. No. 17/439,606.
Written Opinion for PCT/EP2020/072688 dated Nov. 6, 2020 [PCT/ISA/237] (translation).
Office Action issued Oct. 11, 2024 in U.S. Appl. No. 17/439,604.
Office Action issued May 15, 2025, in U.S. Appl. No. 17/439,604.
Notice of Allowance issued Apr. 11, 2025, in U.S. Appl. No. 17/633,212.

* cited by examiner

COMPOSITION AND PROCESS FOR PRODUCING SILYLATED POLYMERS AND USE THEREOF

CROSS REFERENCE TO RELATED APPLICATIONS

This application is a National Stage of International Application No. PCT/EP2020/057864, filed Mar. 20, 2020, claiming priority based on European Patent Application No. 19165363.3, filed Mar. 26, 2019, and European Patent Application No. 19191328.4, filed Aug. 12, 2019.

The present invention relates to compositions comprising moisture-crosslinking polymers and to processes for production thereof, especially of silane-functional hybrid polymers, and to the moisture-crosslinking polymers as such. In a further aspect, the present invention relates to the use of these compositions in CASE sectors (coatings, adhesives, sealants and elastomers), for example in adhesives and sealants.

Polymers such as silylated polyurethanes, for example, that condense ("crosslink") on contact with water or air humidity and at room temperature have long been known. They are also referred to as moisture-crosslinking polymers. Depending on factors including the content of silane groups and the structure thereof, it is possible for long-chain polymers, wide-mesh three-dimensional networks or highly crosslinked systems to form.

Moisture-crosslinking polymers, especially silylated polyurethanes, have long found various uses as adhesives and sealants. For instance, the field of traditional silicone adhesives and sealants based on dimethylpolysiloxanes and of polyurethane adhesives and sealants having free isocyanate groups has developed to include silane-terminated adhesives and sealants.

In the production of polyurethane-containing materials (PU), the person skilled in the art is fundamentally aware of metal-siloxane-silanol(ate) compounds as catalysts, for example from EP 3 063 209 B1 and U.S. Pat. No. 7,737,228 B2.

EP 2 989 155 B1 additionally discloses curing of silylated polymers (SiP), especially of silylated polyurethanes, using oligomeric metallosilsesquioxanes (POMS). Moisture-crosslinking silylated polymers generally have low storage stability. Therefore, measures are typically required to increase the stability of the polymers during storage, for example by the addition of water scavengers to the respective compositions.

It is therefore an object of the present invention to provide a composition comprising at least one silylated polymer (SiP) having improved storage stability.

The object is achieved in accordance with the invention by the provision of a composition obtainable according to Claim 1. Advantageous developments are the subject of the dependent claims or of the further independent claims.

The core of the invention is accordingly provision of a silylated polymer (SiP) by reacting at least one isocyanate-containing compound with at least one isocyanate-reactive compound, catalysed by a metal-siloxane-silanol(ate) compound. Particular preference is given to a silylated polymer obtainable by a synthesis, catalysed by a metal-siloxane-silanol(ate) compound, of at least one hydroxy-functionalized polymer (also "hydroxy-functional polymer"), and a compound having at least one isocyanate group.

It has been found that, surprisingly, the silylated polymers created in accordance with the invention have improved storage stability. This is shown, for example, in the curing of the SiPs thus created by comparison with an SiP that has been synthesized in the presence of a conventional catalyst, in that prolonged fibre time and/or tack-free time is observed. This is true both in cases where no further catalyst is added for the curing and after the addition of a further catalyst (cf. Table A).

The person skilled in the art is aware of fibre time and tack-free time as parameters for the speed of a curing operation. Fibre time (also called skin time) indicates the commencement of the curing reaction or crosslinking of the polymers. Tack-free time gives a value that indicates the conclusion of the through-curing of the outer skin. Specifically, the use of at least one metal-siloxane-silanol(ate) compound as catalyst, even in the production of silylated polymers (SiP), is found to be particularly effective with regard to the resulting storage stability. In spite of prolonged fibre times and/or tack-free times, the silylated polymers (SiP) according to the invention have good and adequate curing.

The inventive use of metal-siloxane-silanol(ate) compounds additionally surprisingly permits performance of the synthesis of the silylated polymers (SiP) at lower temperatures. Synthesis is preferably possible even at temperatures of less than 80° C., preferably of less than 60° C., more preferably of less than 40° C., most preferably at room temperature. One advantage of lower temperatures is that the formation of unwanted by-products is reduced (for example ureidoformamide). This could be attributable to the higher specificity of the crosslinking reaction.

As well as the conservation of resources through lower energy demand and reduction of unwanted by-products, the composition according to the invention may also have improved processability. This can be attributed to the lower viscosity that is typical under some circumstances of the compositions according to the invention by comparison with SiPs created with conventional catalysts. A comparison of the viscosities of compositions that have been created by the use of DBTL as catalyst according to the prior art and of TiPOSS according to the invention (as an example of a catalyst used in accordance with the invention) and of the reactivities thereof is shown in Table A.

A further advantage of the compositions according to the invention is that it is possible to reduce the level of or dispense entirely with the use of tin-containing catalysts.

The particular efficiency of the metal-siloxane-silanol(ate) compounds as catalysts both in the production of the silylated polymers (SiP) according to the invention and in the subsequent curing of the composition according to the invention can reduce the use of catalyst overall. According to the reactants used for production of silylated polymers (SiP), the amounts of catalyst required may be in the range from 20 to 5000 ppm, preferably in the range from 20 to 200 ppm or in the range from 3000 to 4800 ppm.

The efficiency is also manifested in the fact that the composition according to the invention permits the use of ethoxy-functionalized silanes without excessively lowering the reactivity of the SiPs obtained therewith.

"Polymers" are chemical compounds composed of chain or branched molecules (macromolecules) but in turn consist of a number of identical/equivalent or else different units, called the monomers. Polymers also include oligomers. Oligomers are polymers having a smaller number of units. Unless explicitly defined differently, oligomers are included in the concept of polymers in accordance with the invention. Polymers may occur as homopolymers (=consisting only of one monomer unit), copolymers (=consisting of two or more monomer units) or as a polymer mixture (=polymer alloy, polymer blends, i.e. mixtures of different polymers and copolymers).

In the context of the invention, "silylated polymers" are silane-modified, silane-functional or silane-terminated polymers that are also referred to interchangeably as SMP, STP or SiP. The definition includes polymers, polycondensates or polyadducts.

This also includes moisture-curing polymers that can cure under the influence of water, either via addition or mixture constituents of or including water or by contacting with air humidity, preferably with additional use of a catalyst.

Silane-functional polymers are also referred to as hybrid polymers in general use and in accordance with the invention. These polymers can combine the curing chemistry of alkoxysilane groups with the chemistry of the polyols or polyurethanes. Alkoxysilane groups are known from silicone chemistry; the isocyanate-functional polymers, especially hydroxy-functional polymers, contribute at least parts of the polymer backbone of the hybrid polymer.

Crosslinking ("curing") takes place via the reactive silane end groups through ingress of air humidity, for example. The curing mechanism of these systems is preferably neutral.

"Alkoxy" refers to an alkyl group joined via an oxygen atom to the main carbon chain or the main skeleton of the compound.

Silane-functional polymers (SiP) include a polymer backbone (P) and at least two end groups or functional groups or modifications of the following general formula (V)

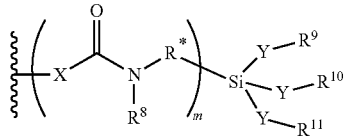

(V)

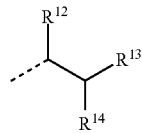

(Vb)

where
X is C, Si or a heteroatom and these, according to their valency, optionally have one or more $R^8$ radicals, preferably C, N, O, P, S, more preferably C, N or O, most preferably N or O, and each is bonded to a carbon in the polymer backbone,
R* is 0 or an optionally substituted straight-chain or branched C1- to C25-alkyl group or an optionally substituted C4- to C18-cycloalkyl group or an optionally substituted C4- to C18-aryl group and, when R*=0, the silicon atom is bonded directly to the nitrogen atom,
each Y is independently either O or a direct bond of the silicon atom to the respective $R^9$, $R^{10}$ or $R^{11}$ radical, and preferably at least one Y is O,
$R^8$ is H, an optionally substituted straight-chain or branched C1- to C25-alkyl group, an optionally substituted straight-chain or branched C2- to C25-alkenyl group or an optionally substituted straight-chain or branched C2- to C18-alkynyl group, an optionally substituted C4- to C18-cycloalkyl group or an optionally substituted C4- to C18-aryl group, or a radical of the general structure (Vb), $R^{12}$ and $R^{14}$ are each independently H or a radical from the group consisting of —$R^{15}$, —COO$R^{15}$ and —CN,
$R^{13}$ is H or a radical from the group consisting of —CH$_2$—COO$R^{15}$, —COO$R^{15}$, —CONHR$^{15}$, —CON(R$^{15}$), —CN, —NO$_2$, —PO(OR$^{15}$)$_2$, —SOR$^{15}$ and —SO$_2$OR$^{15}$,
$R^{15}$ is a hydrocarbyl radical having 1 to 20 carbon atoms and optionally having at least one heteroatom,
$R^9$, $R^{10}$ and $R^{11}$ are independently H, an optionally substituted straight-chain or branched C1- to C20-alkyl group, an optionally substituted straight-chain or branched C2- to C20-alkenyl group or an optionally substituted C4- to C14-cycloalkyl group or an optionally substituted C4- to C14-aryl group,
m is 0 or 1 and, when m=0, the silicon atom is bonded directly to a carbon in the polymer backbone (P).

Unless stated otherwise, N especially denotes nitrogen. In addition, O especially denotes oxygen, unless stated otherwise. S especially denotes sulfur, unless stated otherwise. P especially denotes phosphorus, unless stated otherwise. C especially denotes carbon, unless stated otherwise. H especially denotes hydrogen, unless stated otherwise. Si especially denotes silicon, unless stated otherwise.

"Optionally substituted" means that hydrogen atoms in the corresponding group or in the corresponding radical may be replaced by substituents. Substituents may especially be selected from the group consisting of C1- to C4-alkyl, methyl, ethyl, propyl, butyl, phenyl, benzyl, halogen, fluorine, chlorine, bromine, iodine, hydroxy, amino, alkylamino, dialkylamino, C1- to C4-alkoxy, phenoxy, benzyloxy, cyano, nitro, and thio. If a group is referred to as optionally substituted, it is possible for 0 to 50, especially 0 to 20, hydrogen atoms of the group to be replaced by substituents. If a group is substituted, at least one hydrogen atom is replaced by a substituent.

The term "alkyl group" is to be understood as meaning a saturated hydrocarbon chain. Alkyl groups especially have the general formula —$C_nH_{2n+1}$. The term "C1- to C16-alkyl group" especially denotes a saturated hydrocarbyl chain having 1 to 16 carbon atoms in the chain. Examples of C1- to C16-alkyl groups are methyl, ethyl, propyl, butyl, isopropyl, isobutyl, sec-butyl, tert-butyl, n-pentyl and ethylhexyl. Correspondingly, a "C1- to C8-alkyl group" especially denotes a saturated hydrocarbyl chain having 1 to 8 carbon atoms in the chain. Alkyl groups may especially also be substituted even if this is not stated specifically.

"Straight-chain alkyl groups" denote alkyl groups containing no branches. Examples of straight-chain alkyl groups are methyl, ethyl, n-propyl, n-butyl, n-pentyl, n-hexyl, n-heptyl and n-octyl.

"Branched alkyl groups" denote alkyl groups that are not straight-chain, i.e. in which the hydrocarbyl chain especially has a fork. Examples of branched alkyl groups are isopropyl, isobutyl, sec-butyl, tert-butyl, sec-pentyl, 3-pentyl, 2-methylbutyl, isopentyl, 3-methylbut-2-yl, 2-methylbut-2-yl, neopentyl, ethylhexyl, and 2-ethylhexyl.

"Alkenyl groups" describe hydrocarbon chains containing at least one double bond along the chain. For example, an alkenyl group having a double bond especially has the general formula —CnH2n–1. However, alkenyl groups may also have more than one double bond. The term "C2- to C16-alkenyl group" especially denotes a hydrocarbyl chain having 2 to 16 carbon atoms in the chain. The number of hydrogen atoms varies according to the number of double bonds in the alkenyl group. Examples of alkenyl groups are vinyl-, allyl-, 2-butenyl- and 2-hexenyl-.

"Straight-chain alkenyl groups" denote alkenyl groups containing no branches. Examples of straight-chain alkenyl groups are vinyl, allyl, n-2-butenyl and n-2-hexenyl.

"Branched alkenyl groups" denote alkenyl groups that are not straight-chain, i.e. in which the hydrocarbyl chain especially has a fork. Examples of branched alkenyl groups are 2-methyl-2-propenyl, 2-methyl-2-butenyl and 2-ethyl-2-pentenyl.

"Aryl groups" denote monocyclic (for example phenyl), bicyclic (for example indenyl, naphthalenyl, tetrahydronapthyl or tetrahydroindenyl) and tricyclic (for example fluorenyl, tetrahydrofluorenyl, anthracenyl or tetrahydroanthracenyl) ring systems in which the monocyclic ring system or at least one of the rings in a bicyclic or tricyclic ring system is aromatic. More particularly, a C4- to C14-aryl group denotes an aryl group having 4 to 14 carbon atoms. Aryl groups may especially also be substituted even if this is not stated specifically.

For example, it is possible to use silylated polymers that are moisture-curing in the compositions according to the invention, especially silylated polyethers and/or silylated polyurethane polymers (SPURs). Silylated polymers or silane-terminated polymers that may be used in the composition according to the invention include at least two or more reactive silane groups, for example alkoxysilanes.

One example of possible silylated polymers usable in accordance with the invention is that of oxyalkylene polymers having at least one reactive silane group at each end of the polymer molecule. The backbone of the silane-terminated oxyalkylene polymer according to the invention has repeating units of the general formula (1):

$$—R—O— \quad (1)$$

where R is a divalent organic group, preferably a straight or branched alkylene group including 1 to 14 carbon atoms, more preferably a straight or branched alkylene group including 2 to 4 carbon atoms, or mixtures thereof. Most preferably polypropylene oxide backbones, polyethylene oxide backbones and copolyethylene oxide/copolypropylene oxide backbones are or mixtures thereof. Other repeating units may include, but are not limited to, the following units:

—CH$_2$—O—, —CH$_2$CH(CH$_3$)O—, —CH$_2$CH(C$_2$H$_5$)O—, —CH$_2$C(CH$_3$)O—, —CH$_2$CH$_2$CH$_2$CH$_2$O— and others of similar structure.

The reactive silane groups in the silylated polymers (SiP) may be described by the following formula (2):

$$—Si(R^2)_{3-a}(G)_a \quad (2)$$

where each R$^2$ is independently a C1- to C20-alkyl group, a C6- to C20-aryl group, a C7- to C20-aralkyl group or a mixture thereof, G may represent a hydrolysable group or a hydroxyl group, and when two or more G are present, these may be the same or different, and a is an integer from 1 to 3.

In a reactive silane group described by the formula (2), at least one hydrolysable or hydroxy group is represented by G.

According to the invention, "hydrolysable groups" are those that can enter into hydrolysis reactions through the influence of water, for example from air humidity or through the addition of water or aqueous constituents, and can form silanols as a result thereof. Hydrolysable groups may, for example, be alkoxy groups, and less commonly also —Cl. In a similar manner, these groups (or the silanols formed thereby) may react with OH or COOH groups on the surface and form a composite.

In the context of the invention, "silanols" are organic silicon compounds in which at least one hydroxyl group (OH) is bonded to the silicon atom (—Si—OH).

In the context of the invention, "silanolates" are organic silicon compounds in which at least one deprotonated hydroxy function (R—O—) is bonded to the silicon atom (—Si—O—), where this negatively charged oxygen atom may also be chemically covalently bonded and/or coordinated to further compounds, for example metals.

According to the invention, isocyanate-reactive compounds are those that can react with an isocyanate. These compounds may have one or more NH, OH or SH functions.

The isocyanate-reactive compounds especially include the class of the hydroxy-functional compounds. Polyols are hydroxy-functional compounds, especially hydroxy-functional polymers. Suitable polyols for the preparation of polyurethane polymers are especially polyether polyols, polyester polyols and polycarbonate polyols, and mixtures of these polyols.

"Polyethers" are a class of polymers. They are long-chain compounds comprising at least two identical or different ether groups. According to the invention, polyethers also include those where the polymeric ether groups are interrupted by another group (for example by copolymerized/incorporated isocyanates or further polymeric or oligomeric units of a different monomer origin).

Suitable polyether polyols, also called polyoxyalkylene polyols or oligoetherols, are especially those that are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms, for example water, ammonia or compounds having multiple OH or NH groups, for example ethane-1,2-diol, propane-1,2- or -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3- and -1,4-dimethanol, bisphenol A, hydrogenated bisphenol A, 1,1,1-trimethylolethane, 1,1,1-trimethylolpropane, glycerol, aniline, and mixtures of the compounds mentioned.

It is possible to use either polyoxyalkylene polyols having a low degree of unsaturation (measured in accordance with ASTM D-2849-69 and expressed in milliequivalents of unsaturation per gram of polyol (meq/g)), produced for example using so-called double metal cyanide complex catalysts (DMC catalysts), or polyoxyalkylene polyols having a relatively high degree of unsaturation, produced for example using anionic catalysts such as NaOH, KOH, CsOH or alkali metal alkoxides. Polyoxyethylene polyols and polyoxypropylene polyols are particularly suitable, especially polyoxyethylene diols, polyoxypropylene diols, polyoxyethylene triols, and polyoxypropylene triols.

Especially suitable are polyoxyalkylene diols or polyoxyalkylene triols having a degree of unsaturation lower than 0.02 meq/g and having a molecular weight within a range from 1000 g/mol to 30 000 g/mol, as are polyoxyethylene diols, polyoxyethylene triols, polyoxypropylene diols, and polyoxypropylene triols having a molecular weight of 200 to 20 000 g/mol. Likewise particularly suitable are so-called ethylene oxide-terminated ("EO-endcapped", ethylene oxide-endcapped) polyoxypropylene polyols. The latter are special polyoxypropylene polyoxyethylene polyols that are obtained for example when pure polyoxypropylene polyols, in particular polyoxypropylene diols and triols, are at the end of the polypropoxylation reaction further alkoxylated with ethylene oxide and thus have primary hydroxyl groups. Preference in this case is given to polyoxypropylene polyoxyethylene diols and polyoxypropylene polyoxyethylene triols. Also suitable are hydroxyl-terminated polybutadiene polyols, for example those produced by polymerization of 1,3-butadiene and allyl alcohol or by oxidation of polybutadiene and also the hydrogenation products thereof. Also suitable are styrene-acrylonitrile grafted polyether polyols such as those commercially available for example under the trade name Lupranol® from Elastogran GmbH, Germany.

Suitable polyester polyols include in particular polyesters that bear at least two hydroxyl groups and are produced by known processes, in particular polycondensation of hydroxycarboxylic acids or polycondensation of aliphatic and/or aromatic polycarboxylic acids with dihydric or polyhydric alcohols.

Especially suitable are polyester polyols produced from dihydric to trihydric alcohols such as ethane-1,2-diol, diethylene glycol, propane-1,2-diol, dipropylene glycol, butane-1,4-diol, pentane-1,5-diol, hexane-1,6-diol, neopentyl glycol, glycerol, 1,1,1-trimethylpropane or mixtures of the abovementioned alcohols with organic dicarboxylic acids or the anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, as are polyester polyols formed from lactones such as ε-caprolactone. Particularly suitable are polyester diols, in particular those produced from adipic acid, azelaic acid, sebacic acid, dodecanedicarboxylic acid, dimer fatty acid, phthalic acid, isophthalic acid and terephthalic acid as the dicarboxylic acid or from lactones such as ε-caprolactone and from ethylene glycol, diethylene glycol, neopentyl glycol, butane-1,4-diol, hexane-1,6-diol, dimer fatty acid diol, and cyclohexane-1,4-dimethanol as the dihydric alcohol.

Suitable polycarbonate polyols include in particular those obtainable by reaction for example of the abovementioned alcohols used to form the polyester polyols with dialkyl carbonates such as dimethyl carbonate, diaryl carbonates such as diphenyl carbonate, or phosgene. Polycarbonate diols, in particular amorphous polycarbonate diols, are particularly suitable. In addition, polycarbonate diols or polyether polycarbonate diols may be obtainable via polymerization of propylene oxide with $CO_2$.

Further suitable polyols are poly(meth)acrylate polyols.

Also suitable are polyhydroxy-functional fats and oils, for example natural fats and oils, in particular castor oil, or so-called oleochemical polyols obtained by chemical modification of natural fats and oils, the epoxy polyesters or epoxy polyethers obtained for example by epoxidation of unsaturated oils and subsequent ring opening with carboxylic acids or alcohols respectively, or polyols obtained by hydroformylation and hydrogenation of unsaturated oils. Also suitable are polyols obtained from natural fats and oils by degradation processes such as alcoholysis or ozonolysis and subsequent chemical linking, for example by transesterification or dimerization, of the thus obtained degradation products or derivatives thereof. Suitable breakdown products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Likewise suitable are, in addition, polyhydrocarbon polyols, also referred to as oligohydrocarbonols, for example polyhydroxy-functional ethylene-propylene, ethylene-butylene or ethylene-propylene-diene copolymers, for example those produced by Kraton Polymers, USA, or polyhydroxy-functional copolymers of dienes, such as 1,3-butadiene or diene mixtures, and vinyl monomers such as styrene, acrylonitrile or isobutylene, or polyhydroxy-functional polybutadiene polyols, for example those which are produced by copolymerization of 1,3-butadiene and allyl alcohol and which may also be hydrogenated. Also suitable are polyhydroxy-functional acrylonitrile/butadiene copolymers, such as those that can be produced for example from epoxides or amino alcohols and carboxyl-terminated acrylonitrile/butadiene copolymers that are commercially available under the Hypro® CTBN name from Emerald Performance Materials, LLC, USA.

These likewise particularly preferred polyols may have an average molecular weight of 250 to 40 000 g/mol, especially of 1000 to 30 000 g/mol, and an average OH functionality in the range from 1.6 to 3.

Particularly suitable polyols are polyester polyols and polyether polyols, in particular polyoxyethylene polyol, polyoxypropylene polyol, and polyoxypropylene polyoxyethylene polyol, preferably polyoxyethylene diol, polyoxypropylene diol, polyoxyethylene triol, polyoxypropylene triol, polyoxypropylene polyoxyethylene diol, and polyoxypropylene polyoxyethylene triol.

In addition to these polyols mentioned, it is also possible to use small amounts of low molecular weight di- or polyhydric alcohols, for example ethane-1,2-diol, propane-1,2- and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3- and -1,4-dimethanol, hydrogenated bisphenol A, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular weight alkoxylation products of the aforementioned di- and polyhydric alcohols, and mixtures of the aforementioned alcohols in the preparation of the polymer having terminal isocyanate groups (for example in the AmSi route).

Isocyanate-containing compounds (Iso or Iso-Si) have at least one NCO group (=isocyanate group). A distinction may be made between the monoisocyanates (z=1) and the di- and polyisocyanates (z=≥2). The NCO groups may react, for example, with alcohols to give urethanes or with amines to give urea derivatives. The isocyanate-containing compounds of the invention may be described by the general formula (VI)

(VI)

where
  $R^x$ is a carbon-containing group, preferably at least one aromatic or aliphatic group or mixtures thereof, more preferably an optionally substituted straight-chain or branched C1- to C20-alkyl group, an optionally substituted straight-chain or branched C2- to C20-alkenyl group or an optionally substituted straight-chain or branched C2- to C20-alkynyl group, an optionally substituted C4- to C14-cycloalkyl group or an optionally substituted C4- to C14-aryl group, most preferably diphenylmethane, toluene, dicyclohexylmethane, hexane or methyl-3,5,5-trimethylcyclohexyl or $R^x$ is a —($R^*$)—Si($YR^{9/10/11}$)$_3$ group where $R^9$, $R^{10}$ and $R^{11}$ are independently H, an optionally substituted straight-chain or branched C1- to C25-alkyl group, an optionally substituted straight-chain or branched C2- to C25-alkenyl group or an optionally substituted C4- to C18-cycloalkyl group or an optionally substituted C4- to C18-aryl group, $R^*$ is 0 or an optionally substituted straight-chain or branched C1- to C25-alkyl group or an optionally substituted C4- to C18-cycloalkyl group or an optionally substituted C4- to C18-aryl group and, when $R^*=0$, the silicon atom is bonded directly to the nitrogen atom, each Y is independently either O or a direct bond of the silicon atom to the respective $R^9$, $R^{10}$ or $R^{11}$ radical, and preferably at least one Y is O, and z is at least 1, preferably at least 1 or 2, more preferably 1 or 2.

It has been found that, surprisingly, the silylated polymers (SiP) of the composition according to the invention that are present in Claim 1, when metal-siloxane-silanol(ate) compounds are used as catalyst in the production thereof, are particularly advantageous in the composition according to the invention.

The term "catalyst" relates to a substance that lowers the activation energy of a particular reaction and hence increases the reaction rate.

The term "metal-siloxane-silanol (ate)" refers to all metal-siloxane compounds that contain either one or more silanol and/or silanolate groups. In one embodiment of the invention, it is likewise possible that there are exclusively metal-siloxane-silanolates. If no specific differentiation is made between these different configurations, all combinations are included. The metal-siloxane-silanol (ate) compounds (=metal-siloxane-silanol/silanolate compounds) just described encompass compounds referred to hereinafter as oligomeric metallosilsesquioxanes, "POMS", metal silsesquioxanes or metallized silsesquioxanes.

In one embodiment of the invention, a composition comprises moisture-curing silylated polymers (SiP) that have been prepared under catalysis by at least one metal-siloxane-silanol(ate) compound, wherein the metal-siloxane-silanol (ate) compound was present with a proportion by weight in the range from 0.001% to 1.5%, preferably from 0.002% to 0.5%, based in each case on the total weight of the composition. The compositions according to the invention comprise silylated polymers that have been prepared in the various embodiments by means of catalysis by metal-siloxane-silanol(ate) compounds in molar concentrations in the range from 0.000001 to 0.001 mol/kg or 0.0001 to 0.1 mol/kg, especially from 0.000028 to 0.00014 mol/kg or 0.001 to 0.01 mol/kg, based in each case on the total weight of the composition.

In one embodiment of the present invention, the metal-siloxane-silanol(ate) compound may take the form of a monomer, oligomer and/or polymer for preparation of the silylated polymers (SiP) of the composition according to the invention, the transition from oligomers to polymers being fluid according to the general definition.

The metal(s) was/were preferably present terminally and/or within the chain in the oligomeric and/or polymeric metal-siloxane-silanol(ate) compound.

In the preparation of the silylated polymers (SiP) of the composition according to the invention, the catenated metal-siloxane-silanol(ate) compound is linear, branched and/or a cage.

In a preferred embodiment, the catenated metal-siloxane-silanol(ate) compound in the preparation of the silylated polymers (SiP) of the composition according to the invention has a cage structure.

A "cage" or an oligomeric or polymeric "cage structure" for the purposes of the invention is a three-dimensional arrangement of the catenated metal-siloxane-silanol(ate) compound, wherein individual atoms in the chain form the vertices of a multifaceted base structure of the compound. In this case, the mutually linked atoms form at least two surfaces, giving rise to a common intersection. In one embodiment of the invention, for example, a cubic base structure of the compound is formed. A one-cage structure or else a cage structure in singular form, i.e. a compound that has an isolated cage, is the structure (IVc). Compounds having multiple cages within the compound may be described by the compounds (I) and (Ia) to (Id). According to the invention, a cage may be "open" or else "closed", depending on whether all vertices are bonded, joined or coordinated so as to form a closed cage structure. One example of a closed cage is the structures (II), (IV), (IVb), (IVc).

According to the invention, the term "-nuclear" gives the nuclearity of a compound, how many metal atoms are present therein. A mononuclear compound has one metal atom, whereas a poly- or dinuclear compound has two metal atoms within a compound. The metals may be bonded directly to one another or linked via their substituents. One example of a mononuclear compound according to the invention is, for example, the structures (IV), (IVb), (IVc), (Ia), (Ib) or (Ic); a dinuclear compound is represented by structure (Id).

A mononuclear one-cage structure is represented by the metal-siloxane-silanol(ate) compounds (IV), (IVb) and (IVc). Mononuclear two-cage structures are, for example, the structures (Ia), (Ib) or (Ic).

The metal-siloxane-silanol(ate) compound in the preparation of the silylated polymers (SiP) of the composition according to the invention preferably comprises an oligomeric metal silsesquioxane.

The metal-siloxane-silanol(ate) compound in the preparation of the silylated polymers (SiP) of the composition according to the invention especially comprises a polyhedral metal silsesquioxane.

In one embodiment, the metal-siloxane-silanol(ate) compound in the preparation of the silylated polymers (SiP) for the composition according to the invention has the general formula $R^*_q Si_r O_x M_t$ where each $R^*$ is independently selected from the group consisting of optionally substituted C1- to C20-alkyl, optionally substituted C3- to C8-cycloalkyl, optionally substituted C2- to C20-alkenyl, optionally substituted C5- to C10-aryl, —OH and —O—(C1- to C10-alkyl), each M is independently selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, q is an integer from 4 to 19,
r is an integer from 4 to 10,
s is an integer from 8 to 30, and
t is an integer from 1 to 8.

In a further embodiment, the metal-siloxane-silanol(ate) compound in the preparation of the silylated polymers (SiP) of the composition according to the invention has the general formula $R^{\#}_4Si_4O_{11}Y_2Q_2X_4Z_3$ where each X is independently selected from the group consisting of Si, $M^1$, $-M^3L^1_A$, $M^3$, or $-Si(R^8)-O-M^3L^1_A$, where $M^1$ and $M^3$ are independently selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1- to C20-alkyl, optionally substituted C3- to C8-cycloalkyl, optionally substituted C2- to C20-alkenyl and optionally substituted C5- to C10-aryl, each Z is independently selected from the group consisting of $L^2$, $R^5$, $R^6$ and $R^7$, where $L^2$ is selected from the group consisting of —OH and —O—(C1- to C10-alkyl), especially —O—(C1- to C8-alkyl) or —O—(C1- to C6-alkyl), or where $L^2$ is selected from the group consisting of —OH, —O— methyl, —O-ethyl, —O-propyl, —O-butyl, —O-octyl, —O-isopropyl, and —O-isobutyl;

each $R^{\#}$, $R^5$, $R^6$ and $R^7$ is independently selected from the group consisting of optionally substituted C1- to C20-alkyl, optionally substituted C3- to C8-cycloalkyl, optionally substituted C2- to C20-alkenyl and optionally substituted C5- to C10-aryl; each Y is independently $-O-M^2-L^3_A$, or two Y are associated and together are $-O-M^2(L^3_A)-O-$ or $-O-$, where $L^3$ is selected from the group consisting of —OH and —O—(C1- to C10-alkyl), especially —O—(C1- to C8-alkyl) or —O—(C1- to C6-alkyl), or where $L^3$ is selected from the group consisting of —OH, —O-methyl, —O-ethyl, —O-propyl, —O-butyl, —O-octyl, —O-isopropyl, and —O-isobutyl, and each $M^2$ is independently selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, each Q is independently H, $M^4L^4_A$, $-SiR^8$, $-M^3L^1_A$, a single bond joined to $M^3$ of X or a single bond joined to the Si atom of the $-Si(R^8)-O-M^3L^1_A$ radical, where $M^3$, $R^8$ and $L^1$ are as defined for X, where $M^4$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and where $L^4$ is selected from the group consisting of —OH and —O—(C1- to C10-alkyl), especially —O—(C1- to C8-alkyl) or —O—(C1- to C6-alkyl), or where $L^4$ is selected from the group consisting of —OH, —O-methyl, —O-ethyl, —O-propyl, —O-butyl, —O-octyl, —O-isopropyl, and —O-isobutyl, with the proviso that at least one X is $M^3$, $-M^3L^1_A$ or $-Si(R^8)-O-M^3L^1_A$.

It is known to the person skilled in the art that the number (A) of possible ligands for $L^1_A$, $L^2_A$, $L^3_A$, $L^4_A$ results directly from the number of free valences of the metal atom used, where the valence number describes the valency of the metal.

In a further embodiment, the metal-siloxane-silanol(ate) compound in the preparation of the silylated polymers (SiP) for the composition according to the invention has the general formula $(Y_{0.25}R^{\#}SiO_{1.25})_4(Z_{0.75}Y_{0.25}XO)_4(OQ)_2$ where each X is independently selected from the group consisting of Si, $M^1$, $-M^3L^1_A$, $M^3$, or $-Si(R^8)-O-M^3L^1_A$, where $M^1$ and $M^3$ are independently selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1- to C20-alkyl, optionally substituted C3- to C6-cycloalkyl, optionally substituted C2- to C20-alkenyl and optionally substituted C6- to C10-aryl;

each Z is independently selected from the group consisting of $L^2$, $R^5$, $R^6$ and $R^7$, where $L^2$ is selected from the group consisting of —OH and —O—(C1- to C10-alkyl), especially —O—(C1- to C8-alkyl) or —O—(C1- to C6-alkyl), or where $L^2$ is selected from the group consisting of —OH, —O— methyl, —O-ethyl, —O-propyl, —O-butyl, —O-octyl, —O-isopropyl, and —O-isobutyl;

each $R^{\#}$, $R^5$, $R^6$ and $R^7$ is independently selected from the group consisting of optionally substituted C1- to C20-alkyl, optionally substituted C3- to C6-cycloalkyl, optionally substituted C2- to C20-alkenyl and optionally substituted C6- to C10-aryl;

each Y is independently $-O-M^2-L^3_A$, or two Y are associated and together are $-O-M^2(L^3_A)-O-$ or $-O-$, where $L^3$ is selected from the group consisting of —OH and —O—(C1- to C10-alkyl), especially —O—(C1- to C8-alkyl) or —O—(C1- to C6-alkyl), or where $L^3$ is selected from the group consisting of —OH, —O-methyl, —O-ethyl, —O-propyl, —O-butyl, —O-octyl, —O-isopropyl, and —O-isobutyl, and each $M^2$ is independently selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, each Q is independently H, $M^4L^4_A$, —$SiR^8$, -$M^3L^1_A$, a single bond joined to $M^3$ of X or a single bond joined to the Si atom of the —$Si(R^8)$—O-$M^3L^1_A$ radical, where $M^3$, $R^8$ and $L^1$ are as defined for X, where $M^4$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and where $L^4$ is selected from the group consisting of —OH and —O—(C1- to C10-alkyl), especially —O—(C1- to C8-alkyl) or —O—(C1- to C6-alkyl), or where $L^4$ is selected from the group consisting of —OH, —O-methyl, —O-ethyl, —O-propyl, —O-butyl, —O-octyl, —O-isopropyl, and —O-isobutyl, with the proviso that at least one X is $M^3$, -$M^3L^1_A$ or —$Si(R^8)$—O-$M^3L^1_A$.

The metal-siloxane-silanol(ate) compound in the preparation of the silylated polymers (SiP) for the composition according to the invention preferably has the general formula $Si_4O_9R^1R^2R^3R^4X^1X^2X^3X^4OQ^1OQ^2Y^1Y^2Z^1Z^2Z^3$ where $X^1$, $X^2$ and $X^3$ are independently selected from Si and $M^1$, where $M^1$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, $Z^1$, $Z^2$ and $Z^3$ are independently selected from the group consisting of $L^2$, $R^5$, $R^6$ and $R^7$, where $L^2$ is selected from the group consisting of —OH and —O—(C1- to C10-alkyl), especially —O—(C1- to C8-alkyl) or —O—(C1- to C6-alkyl), or where $L^2$ is selected from the group consisting of —OH, —O-methyl, —O-ethyl, —O-propyl, —O-butyl, —O-octyl, —O-isopropyl, and —O-isobutyl;

$R^1$, $R^2$, $R^3$, $R^4$, $R^5$, $R^6$ and $R^7$ are independently selected from the group consisting of optionally substituted C1- to C20-alkyl, optionally substituted C3- to C8-cycloalkyl, optionally substituted C2- to C20-alkenyl and optionally substituted C5- to C10-aryl;

$Y^1$ and $Y^2$ are independently —O-$M^2$-$L^3_A$, or $Y^1$ and $Y^2$ are associated and together are —O-$M^2(L^3_A)$-O— or —O—, where $L^3$ is selected from the group consisting of —OH and —O—(C1- to C10-alkyl), especially —O—(C1- to C8-alkyl) or —O—(C1- to C6-alkyl), or where $L^3$ is selected from the group consisting of —OH, —O-methyl, —O-ethyl, —O-propyl, —O-butyl, —O-octyl, —O-isopropyl, and —O-isobutyl, and $M^2$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and $X^4$ is -$M^3L^1_A$ or $M^3$ and $Q^1$ and $Q^2$ are each H or a single bond joined to $M^3$, where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O-methyl, —O— ethyl, —O-propyl, —O-butyl, —O-octyl, —O-isopropyl, and —O-isobutyl, and where $M^3$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, or $X^4$ is -$M^3L^1_A$ and $Q^2$ is H or a single bond joined to $M^3$ and $Q^1$ is H, $M^4L^4_A$ or —$SiR^8$, where $M^4$ is selected from the group consisting of s- and p-block metals, d- and f-block transition metals, lanthanide and actinide metals and semimetals, especially from the group consisting of metals from transition group 2, 3, 4, 5 and 8 and metals from main group 1, 2, 3, 4 and 5, especially from the group consisting of Zn, Sc, Ti, Zr, Hf, V, Pt, Ga, Sn and Bi, where $L^4$ is selected from the group consisting of —OH and —O—(C1- to C10-alkyl), especially —O—(C1- to C8-alkyl) or —O—(C1- to C6-alkyl), or where $L^4$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1- to C20-alkyl, optionally substituted C3- to C8-cycloalkyl, optionally substituted C2- to C20-alkenyl and optionally substituted C5- to C10-aryl, or $X^4$, $Q^1$ and $Q^2$ are independently -$M^3L^1_A$, or $X^4$ is —$Si(R^8)$—O-$M^3L^1$, $Q^2$ is a single bond joined to the silicon atom of $X^4$ and $Q^1$ is -$M^4L^4_A$, or $X^4$ is —$Si(R^8)$—O-$M^3L^1_A$, $Q^2$ is a single bond joined to the silicon atom of $X^4$ and $Q^1$ is a single bond joined to the $M^3$ atom of $X^4$.

In a further embodiment, the metal silsesquioxane in the preparation of the silylated polymers (SiP) has the general formula $(X^4)(Z^1Y^1X^2O)(Z^2X^1O_2)(Z^3X^3O_2)(R^1Y^2SiO)(R^3SiO)(R^4SiO_2)(R^2SiO_2)(Q^1)(Q^2)$ where $X^1$, $X^2$ and $X^3$ are independently selected from Si and $M^1$, where $M^1$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, $Z^1$, $Z^2$ and $Z^3$ are independently selected from the group consisting of $L^2$, $R^5$, $R^6$ and $R^7$, where $L^2$ is selected from the group consisting of —OH and —O—(C1- to C10-alkyl), especially —O—(C1- to C8-alkyl) or —O—(C1- to C6-alkyl), or where $L^2$ is selected from the group consisting of —OH, —O-methyl, —O-ethyl, —O-propyl, —O-butyl, —O-octyl, —O-isopropyl, and —O-isobutyl;

$R^1$, $R^2$, $R^3$, $R^4$, $R^5$, $R^6$ and $R^7$ are independently selected from the group consisting of optionally substituted C1- to C20-alkyl, optionally substituted C3- to C6-cycloalkyl, optionally substituted C2- to C20-alkenyl and optionally substituted C6- to C10-aryl;

$Y^1$ and $Y^2$ are independently —O-$M^2$-$L^3{}_A$, or $Y^1$ and $Y^2$ are associated and together are —O-$M^2(L^3{}_A)$-O— or —O—, where $L^3$ is selected from the group consisting of —OH and —O—(C1- to C10-alkyl), especially —O—(C1- to C8-alkyl) or —O—(C1- to C6-alkyl), or where $L^3$ is selected from the group consisting of —OH, —O-methyl, —O-ethyl, —O-propyl, —O-butyl, —O-octyl, —O-isopropyl, and —O-isobutyl, and $M^2$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and $X^4$ is -$M^3L^1{}_A$ or $M^3$ and $Q^1$ and $Q^2$ are each H or a single bond joined to $M^3$, where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O-methyl, —O— ethyl, —O-propyl, —O-butyl, —O-octyl, —O-isopropyl, and —O-isobutyl, and where $M^3$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, or $X^4$ is -$M^3L^1{}_A$ and $Q^2$ is H or a single bond joined to $M^3$ and $Q^1$ is H, $M^4L^4{}_A$ or —$SiR^8$, where M4 is selected from the group consisting of s- and p-block metals, d- and f-block transition metals, lanthanide and actinide metals and semimetals, especially from the group consisting of metals from transition group 2, 3, 4, 5 and 8 and metals from main group 1, 2, 3, 4 and 5, especially from the group consisting of Zn, Sc, Ti, Zr, Hf, V, Pt, Ga, Sn and Bi, where $L^4$ is selected from the group consisting of —OH and —O—(C1- to C10-alkyl), especially —O—(C1- to C8-alkyl) or —O—(C1- to C6-alkyl), or where $L^4$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1- to C20-alkyl, optionally substituted C3- to C6-cycloalkyl, optionally substituted C2- to C20-alkenyl and optionally substituted C6- to C10-aryl, or $X^4$, $Q^1$ and $Q^2$ are independently -$M^3L^1{}_A$, or $X^4$ is —Si($R^8$)—O-$M^3L^1{}_A$, $Q^2$ is a single bond joined to the silicon atom of $X^4$ and $Q^1$ is -$M^4L^4{}_A$, or $X^4$ is —Si($R^8$)—O-$M^3L^1{}_A$, $Q^2$ is a single bond joined to the silicon atom of $X^4$ and $Q^1$ is a single bond joined to the $M^3$ atom of $X^4$.

In a further aspect of the invention, the catalyst used in accordance with the invention and based on a metal-siloxane-silanol(ate) compound may be described by the structure (I)

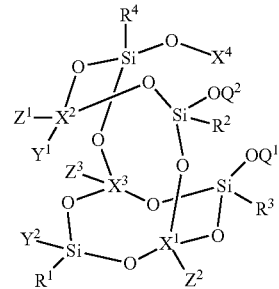

(I)

where $X^1$, $X^2$ and $X^3$ are independently selected from Si and $M^1$, where $M^1$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, $Z^1$, $Z^2$ and $Z^3$ are independently selected from the group consisting of $L^2$, $R^5$, $R^6$ and $R^7$, where $L^2$ is selected from the group consisting of —OH and —O—(C1- to C10-alkyl), especially —O—(C1- to C8-alkyl) or —O—(C1- to C6-alkyl), or where $L^2$ is selected from the group consisting of —OH, —O-methyl, —O-ethyl, —O-propyl, —O-butyl, —O-octyl, —O-isopropyl, and —O-isobutyl;

$R^1$, $R^2$, $R^3$, $R^4$, $R^5$, $R^6$ and $R^7$ are independently selected from the group consisting of optionally substituted C1- to C20-alkyl, optionally substituted C3- to C8-cycloalkyl, optionally substituted C2- to C20-alkenyl and optionally substituted C5- to C10-aryl;

$Y^1$ and $Y^2$ are independently —O-$M^2$-$L^3{}_A$, or $Y^1$ and $Y^2$ are associated and together are —O-$M^2(L^3{}_A)$-O— or —O—, where $L^3$ is selected from the group consisting of —OH and —O—(C1- to C10-alkyl), especially —O—(C1- to C8-alkyl) or —O—(C1- to C6-alkyl), or where $L^3$ is selected from the group consisting of —OH, —O-methyl, —O-ethyl, —O-propyl, —O-butyl, —O-octyl, —O-isopropyl, and —O-isobutyl, and where $M^2$ is selected from the group consisting of s- and p-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn, Bi, and $X^4$ is -$M^3L^1{}_A$ or $M^3$ and $Q^1$ and $Q^2$ are each H or a single bond joined to $M^3$, where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O— methyl, —O-ethyl, —O-propyl, —O-butyl, —O-octyl, —O-isopropyl, and —O-isobutyl, and where $M^3$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn, Bi,
or $X^4$ is -$M^3L^1$ and $Q^2$ is H or a single bond joined to $M^3$ and $Q^1$ is H, $M^4L^4_A$ or —$SiR^8$, where $M^4$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, where $L^4$ is selected from the group consisting of —OH and —O—(C1- to C10-alkyl), especially —O—(C1- to C8-alkyl) or —O—(C1- to C6-alkyl), or where $L^4$ is selected from the group consisting of —OH, —O— methyl, —O-ethyl, —O-propyl, —O-butyl, —O-octyl, —O-isopropyl, and —O-isobutyl, and where $R^8$ is selected from the group consisting of optionally substituted C1- to C20-alkyl, optionally substituted C3- to C6-cycloalkyl, optionally substituted C2- to C20-alkenyl and optionally substituted C6- to C10-aryl,
or $X^4$, $Q^1$ and $Q^2$ are independently -$M^{3\,1.4}$,
or $X^4$ is —$Si(R^8)$—O-$M^3L^1_A$, $Q^2$ is a single bond joined to the silicon atom of $X^4$ and $Q^1$ is -$M^4L^4_A$,
or $X^4$ is —$Si(R^8)$—O-$M^3L^1_A$, $Q^2$ is a single bond joined to the silicon atom of $X^4$ and $Q^1$ is a single bond joined to the $M^3$ atom of $X^4$.

In a further preferred embodiment, the metal-siloxane-silanol(ate) compound in the preparation of the silylated polymers has the general formula (I) where $X^1$, $X^2$ and $X^3$ are independently Si, $X^4$ is -$M^3L^1_A$ and $Q^1$ and $Q^2$ are each a single bond joined to $M^3$, where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O-methyl, —O-ethyl, —O— propyl, —O-butyl, —O-octyl, —O-isopropyl, and —O-isobutyl, and where $M^3$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, $Z^1$, $Z^2$ and $Z^3$ are each independently optionally substituted C1- to C20-alkyl, optionally substituted C3- to C8-cycloalkyl, optionally substituted C2- to C20-alkenyl and optionally substituted C5- to C10 aryl, $R^1$, $R^2$ and $R^3$ are each independently optionally substituted C1- to C20-alkyl, optionally substituted C3- to C8-cycloalkyl, optionally substituted C2- to C20-alkenyl and optionally substituted C5- to C10 aryl, $Y^1$ and $Y^2$ are associated and together form —O—.

In one embodiment, the metal-siloxane-silanol(ate) compound of formula (I) in the preparation of the silylated polymers (SiP) for the composition according to the invention, depending on the equivalents of metal present, may be in mononuclear form as a monomer or in polynuclear form as a dimer (dinuclear), trimer (trinuclear), multimer (multinuclear) and/or mixtures thereof, such that, for example, structures of the formula (Ia) to (Id) are possible.

Further polynuclear metal-siloxane-silanol(ate) compounds usable in accordance with the invention are the structures (Ia), (Ib), (Ic) and (Id)

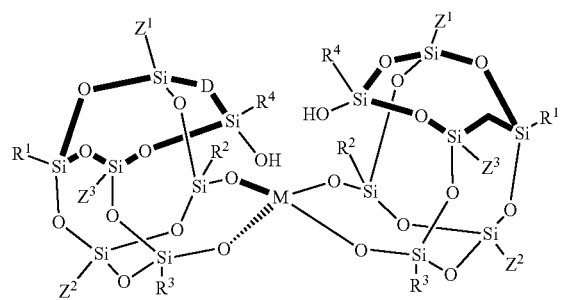

(Ia)

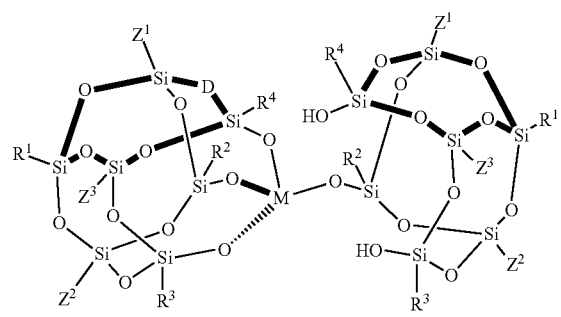

(Ib)

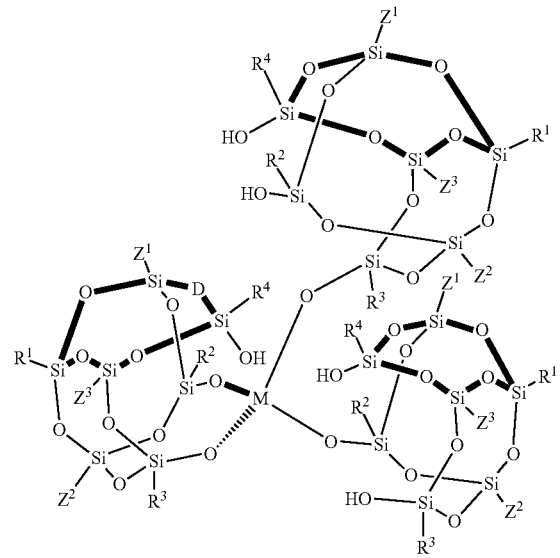

(Ic)

where

M is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and each R ($R^1$ to $R^4$) is independently selected from the group consisting of optionally substituted C1- to C20-alkyl, optionally substituted C3- to C8-cycloalkyl, optionally substituted C2- to C20-alkenyl, optionally substituted C5- to C10-aryl, —OH and —O—(C1- to C10-alkyl). The tetravalent metal M here is a shared part of multiple cages. It is known here to the person skilled in the art that the number of bonds to the metal M depends on the valency of the metal M. The structural formulae (Ia) to (Ic) should be adjusted correspondingly if necessary.

In one embodiment of the composition according to the invention, in the preparation of the silylated polymers (SiP), a mixture of the metal-siloxane-silanol(ate) compounds of formula (I), (Ia), (Ib) and (Ic) is used.

In addition, the polynuclear methyl-siloxane-silanol(ate) compound of formula (Id) in preparation of the silylated polymers (SiP) of the composition according to the invention may have hexacoordinated metal centres, enabling structures of formula (Id)

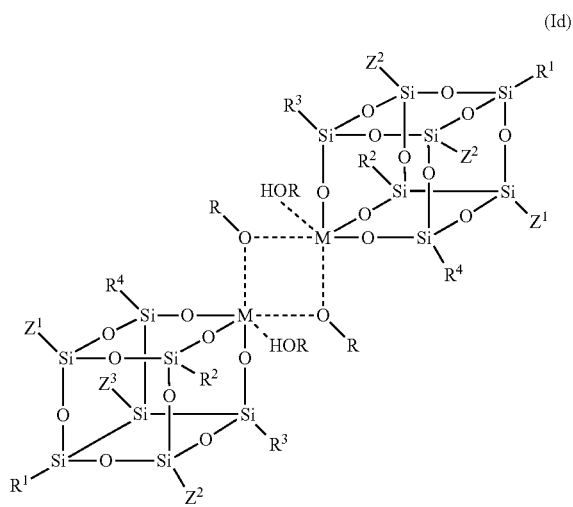

(Id)

where each M is independently selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and each R is independently selected from the group consisting of optionally substituted C1- to C20-alkyl, optionally substituted C3- to C8-cycloalkyl, optionally substituted C2- to C20-alkenyl, optionally substituted C5- to C10-aryl, —OH and —O—(C1- to C10-alkyl).

In the context of the invention, the term "mononuclear" refers to the isolated cage structure, i.e. present in singular form, of the catalyst according to the invention based on a metal-siloxane-silanol(ate) compound. Mononuclear catalysts based on a metal-siloxane-silanol(ate) compound may be encompassed by the structure (IV) and likewise by the structures (I) and (II)

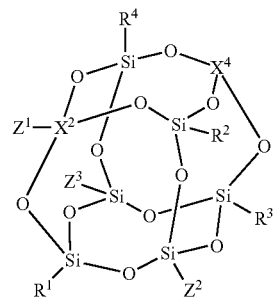

(II)

where $X^4$ is -$M^3L^1_A$ where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O-methyl, —O-ethyl, —O-propyl, —O-butyl, —O-octyl, —O-isopropyl, and —O— isobutyl, and where $M^3$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, $Z^1$, $Z^2$ and $Z^3$ are independently selected from the group consisting of optionally substituted C1- to C20-alkyl, optionally substituted C3- to C8-cycloalkyl, optionally substituted C2- to C20-alkenyl and optionally substituted C5- to C10-aryl;

$R^1$, $R^2$, $R^3$ and $R^4$ are each independently selected from the group consisting of optionally substituted C1- to C20-alkyl, optionally substituted C3- to C8-cycloalkyl, optionally substituted C2- to C20-alkenyl and optionally substituted C5- to C10-aryl.

The invention further relates to the metal-siloxane-silanol(ate) compounds of the general structural formula (II) that are used for preparation of the silylated polymers according to the invention, where $X^4$ is -$M^3L^1_A$ where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s- and p-block metals, d- and f-block transition metals, lanthanide and actinide metals and semimetals, especially from the group consisting of metals from transition group 1, 2, 3, 4, 5, 8, 10 and 11 and metals from main group 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, $Z^1$, $Z^2$ and $Z^3$ are independently selected from the group consisting of $L^2$, $R^5$, $R^6$ and $R^7$, where $L^2$ is selected from the group consisting of —OH and —O—(C1- to C10-alkyl), especially —O—(C1- to C8-alkyl) or —O—(C1- to C6-alkyl), or where $L^2$ is selected from the group consisting of —OH, —O-methyl, —O-ethyl, —O-propyl, —O-butyl, —O-octyl, —O-isopropyl, and —O-isobutyl, and $R^1$, $R^2$, $R^3$, $R^4$, $R^5$, $R^6$ and $R^7$ are independently selected from the group consisting of optionally substituted C1- to C20-alkyl, optionally substituted C3- to C8-cycloalkyl, optionally substituted C2- to C20-alkenyl and optionally substituted C5- to C10-aryl.

In a particularly advantageous embodiment, the silylated polymers (SiP) of the composition according to the invention may have been prepared by a catalysed reaction with heptaisobutyl POSS-titanium(IV) ethoxide (TiPOSS) as a metal-siloxane-silanol(ate) compound. The abbreviation "TiPOSS" here represents the monovalent titanium-metallized silsesquioxane of the structural formula (IV) and can be used in an equivalent manner to "heptaisobutyl POSS-titanium(IV) ethoxide" for the purposes of the invention.

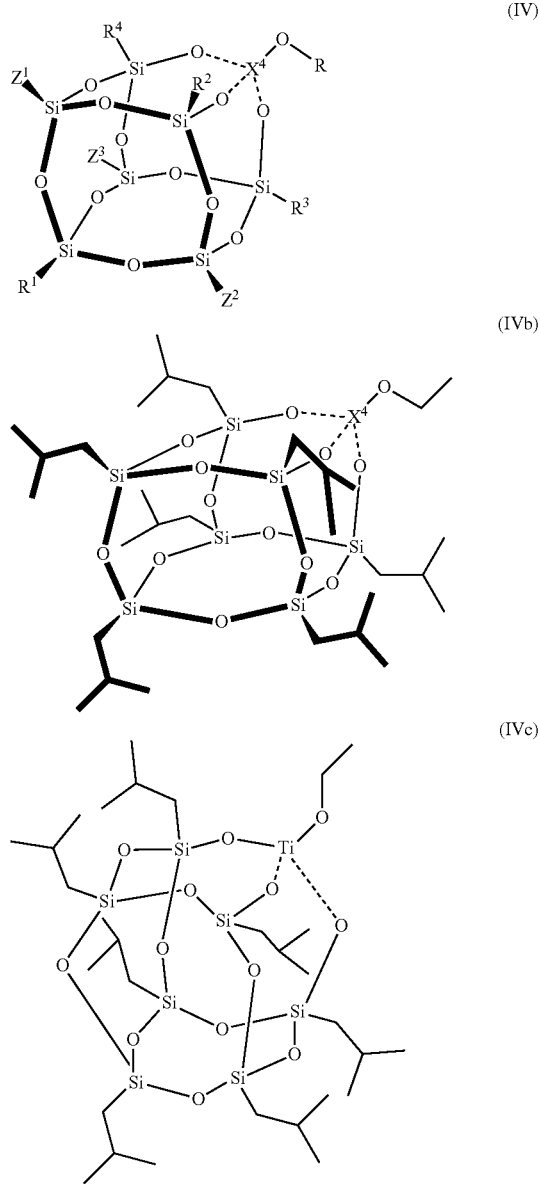

(IV)

(IVb)

(IVc)

In the composition according to the invention, the metal-siloxane-silanol(ate) compound in the preparation of the silylated polymers (SiP) may be a mixture comprising structures (I), (Ia), (Ib), (Ic), (Id), (II), (IV), (IVb), (IVc).

In a preferred embodiment, the metal in the metal-siloxane-silanol(ate) compound is a titanium.

In a further-preferred embodiment, the composition may additionally comprise a catalyst selected from the aroup consistina of metal-siloxane-silanol(ate) compounds, such as heptaisobutyl POSS-titanium(IV) ethoxide (TiPOSS), heptaisobutyl POSS-tin(IV) ethoxide (SnPOSS), tetraalkyl titanates, such as tetramethyl titanate, tetraethyl titanate, tetra-n-propyl titanate, tetraisopropyl titanate, tetra-n-butyl titanate, tetraisobutyl titanate, tetra-sec-butyl titanate, tetraoctyl titanate, tetra(2-ethylhexyl) titanate, dialkyl titanates $((RO)_2TiO_2$ in which R is, for example, isopropyl, n-butyl, isobutyl), such as isopropyl n-butyl titanate; titanium acetylacetonate chelates, such as diisopropoxybis(acetylacetonate) titanate, diisopropoxybis(ethylacetylacetonate) titanate, di-n-butylbis(acetylacetonate) titanate, di-n-butyl-bis (ethylacetoacetat) titanate, triisopropoxidebis (acetylacetonate) titanate, zirconium tetraalkoxides, such as zirconium tetraethoxide, zirconium tetrabutoxide, zirconium tetrabutyrate, zirconium tetrapropoxide, zirconium carboxylates, such as zirconium diacetate; zirconium acetylacetonate chelates, such as zirconium tetra(acetylacetonate), tributoxyzirconium acetylacetonate, dibutoxyzirconium (bisacetylacetonate), aluminium trisalkoxides, such as aluminium triisopropoxide, aluminium trisbutoxide; aluminium acetylacetonate chelates, such as aluminium tris(acetylacetonate) and aluminium tris(ethylacetylacetonate), organotin compounds such as dibutyltin dilaurate (DBTL), dibutyltin maleate, dibutyltin diacetate, tin(II) 2-ethylhexanoate (tin octoate), tin naphthenate, dimethyltin dineodecanoate, dioctyltin dineodecanoate, dimethyltin dioleate, dioctyltin dilaurate, dimethyl mercaptide, dibutyl mercaptide, dioctyl mercaptide, dibutyltin dithioglycolate, dioctyltin glycolate, dimethyltin glycolate, a solution of dibutyltin oxide, reaction products of zinc salts and organic carboxylic acids (carboxylates), such as zinc(II) 2-ethylhexanoate or zinc(II) neodecanoate, mixtures of bismuth carboxylates and zinc carboxylates, reaction products of bismuth salts and organic carboxylic acids, such as bismuth(III) tris(2-ethylhexanoate) and bismuth(III) tris(neodecanoate) and bismuth complexes, organolead compounds such as lead octoxide, organovanadium compounds, amine compounds such as butylamine, octylamine, dibutylamine, monoethanolamine, diethanolamine, triethanolamine, diethylenetriamine, oleylamine, cyclohexylamine, benzylamine, diethylaminopropylamine, xylylenediamine, triethylendiamine, guanidine, diphenylguanidine, 2,4,6-tris(dimethylaminomethyl)phenol, morpholine, N-methylmorpholine, 2-ethyl-4-methylimidazole and 1,8-diazabicylo(5.4.0)undecene-7 (DBU), salts of these amines with carboxylic acids or other acids or mixtures thereof, preferably metal-siloxane-silanol(ate) compounds, especially heptaisobutyl POSS-titanium(IV) ethoxide (TiPOSS), dibutyltin dilaurate (DBTL), tin(II) 2-ethylhexanoate (tin octoate), zinc(II) 2-ethylhexanoate, zinc(II) neodecanoate, bismuth(III) tris(2-ethylhexanoate), bismuth (III) tris(neodecanoate) or mixtures thereof, more preferably metal-siloxane-silanol(ate) compounds, especially heptaisobutyl POSS-titanium(IV) ethoxide (TiPOSS) or heptaisobutyl POSS-tin(IV) ethoxide (SnPOSS), dibutyltin dilaurate (DBTL) or mixtures thereof, most preferably heptaisobutyl POSS-titanium(IV) ethoxide (TiPOSS), heptaisobutyl POSS-tin(IV) ethoxide (SnPOSS), dibutyltin dilaurate (DBTL) or mixtures thereof.

According to the invention, it is possible to prepare silylated polymer (SiP) by two routes by a metal-siloxane-silanol(ate) compound-catalysed synthesis of at least one isocyanate-reactive compound, especially a hydroxy-functionalized polymer, and a compound having at least one isocyanate group.

In one route according to the invention, the synthesis is effected via a metal-siloxane-silanol(ate) compound-catalysed synthesis of an isocyanate-reactive compound, especially a hydroxy-functionalized polymer, and a di- or polyisocyanate compound (Iso). Subsequently, the resultant isocyanate group-containing prepolymer is reacted with an aminosilane (AmSi) to give the silylated polymer (SiP) according to the invention. This synthesis route is referred to in accordance with the invention as the "AmSi route".

Di- or polyisocyanates (Iso) used for the preparation of the polymer of the invention may be conventional isocyanates, especially di- or polyisocyanates of the general formula (VI)

(VI)

where
R$^x$ is a carbon-containing group, preferably at least one aromatic or aliphatic group or mixtures thereof, more preferably an optionally substituted straight-chain or branched C1- to C20-alkyl group, an optionally substituted straight-chain or branched C2- to C20-alkenyl group or an optionally substituted straight-chain or branched C2- to C20-alkynyl group, an optionally substituted C4- to C14-cycloalkyl group or an optionally substituted C4- to C14-aryl group, most preferably diphenylmethane, toluene, dicyclohexylmethane, hexane or methyl-3,5,5-trimethylcyclohexyl and
z is at least 2, preferably 2 or >2.

For example, suitable diisocyanates are methylene diphenyl isocyanate (MDI), especially from 4,4'-methylene diphenyl isocyanate (4,4'-MDI), 2,4'-methylene diphenyl isocyanate (2,4'-MDI), 2,2'-methylene diphenyl isocyanate (2,2'-MDI), 4,4'-diisocyanatodicyclohexylmethane (H12MDI), 2-methylpentamethylene 1,5-diisocyanate, dodecamethylene 1,12-diisocyanate, lysine and lysine ester diisocyanate, cyclohexane 1,3-diisocyanate, cyclohexane 1,4-diisocyanate, perhydro(diphenylmethane 2,4'-diisocyanate), perhydro(diphenylmethane 4,4'-diisocyanate), 1,4-diisocyanato-2,2,6-trimethylcyclohexane (TMCDI), 3-isocyanatomethyl-3,5,5-trimethylcyclohexyl isocyanate (=isophorone diisocyanate or IPDI), hexamethylene 1,6-diisocyanate (HDI) or the trimer thereof (HDI trimer), 2,2,4- and/or 2,4,4-trimethylhexamethylene 1,6-diisocyanate, 1,4-bis(isocyanato)cyclohexane, 1,4-bis(isocyanato)benzene (PPDI), 1,3- and/or 1,4-bis(isocyanatomethyl)cyclohexane, m- and/or p-xylylene diisocyanate (m- and/or p-XDI), m- and/or p-tetramethylxylylene 1,3-diisocyanate, m- and/or p-tetramethylxylylene 1,4-diisocyanate, bis(1-isocyanato-1-methylethyl)naphthalene, 1,3-bis(isocyanato-4-methylphenyl)-2,4-dioxo-1,3-diazetidine, naphthalene 1,5-diisocyanate (NDI), 3,3'-dimethyl-4,4'-diisocyanatodiphenyl (TODI), tolylene 2,4- and/or 2,6-diisocyanate (TDI), 1,3-bis(isocyanatomethyl)benzene or mixtures thereof, preferably 4,4'-methylene diphenyl isocyanate (4,4'-MDI) or isophorone diisocyanate (IPDI), hexamethylene 1,6-diisocyanate (HDI) or the trimer thereof (HDI trimer) or mixtures thereof, most preferably 4,4'-methylene diphenyl isocyanate (4,4'-MDI) or isophorone diisocyanate (IPDI), oligomers and polymers of the aforementioned isocyanates, and any mixtures of the aforementioned isocyanates.

The subsequent reaction with an aminosilane (AmSi) of the formula (VIII) affords the silylated polymer (SiP)

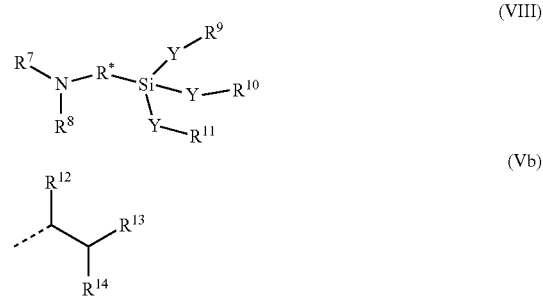

where
R$^7$ is H,
R$^8$ is H, an optionally substituted straight-chain or branched C1- to C25-alkyl group, an optionally substituted straight-chain or branched C2- to C25-alkenyl group or an optionally substituted C4- to C18-cycloalkyl group or an optionally substituted C4- to C18-aryl group, or a radical of the general structure (Vb),
R* is 0 or an optionally substituted straight-chain or branched C1- to C25-alkyl group or an optionally substituted C4- to C18-cycloalkyl group or an optionally substituted C4- to C18-aryl group and, when R*=0, the silicon atom is bonded directly to the nitrogen atom,
R$^{12}$ and R$^{14}$ are each independently H or a radical from the group consisting of —R$^{15}$, —COOR$^{15}$ and —CN,
R$^{13}$ is H or a radical from the group consisting of —CH$_2$—COOR$^{15}$, —COOR$^{15}$, —CONHR$^{15}$, —CON(R$^{15}$), —CN, —NO$_2$, —PO(OR$^{15}$)$_2$, —SOR$^{15}$ and —SO$_2$OR$^{15}$,
R$^{15}$ is a hydrocarbyl radical having 1 to 20 carbon atoms and optionally having at least one heteroatom,
R$^9$, R$^{10}$ and R$^{11}$ are independently H, an optionally substituted straight-chain or branched C1- to C25-alkyl group, an optionally substituted straight-chain or branched C2- to C25-alkenyl group or an optionally substituted C4- to C18-cycloalkyl group or an optionally substituted C4- to C18-aryl group,
each Y is independently either O or a direct bond of the silicon atom to the respective R$^9$, R$^{10}$ or R$^{11}$ radical.

"Aminosilanes" refer to organosilanes wherein the organic radical has an amino group. "Primary aminosilanes" refer to aminosilanes having a primary amino group, i.e. an NH2 group bonded to one organic radical. "Secondary aminosilanes" refer to aminosilanes having a secondary amino group, i.e. an NH2 group bonded to two organic radicals.

The silylated polymer (SiP) according to the invention can be obtained by a second route. This second synthesis route is referred to in accordance with the invention as "Iso-Si route" or "isocyanate route".

The reaction of an isocyanatosilane (Iso-Si) of the formula (VI), preferably of the formula (VII), with a polymer having functional end groups reactive toward isocyanates groups, especially hydroxyl groups, mercapto groups and/or amino groups. This reaction can be effected in a stoichiometric ratio of the isocyanate groups to the functional end groups reactive toward isocyanate groups of 0.9:1.1 to 1.1:0.9, or with a slight excess of the functional end groups reactive toward isocyanate groups, for example at temperatures of 20° C. to 100° C., with additional use of at least one metal-siloxane-silanol(ate) compound as catalyst.

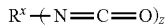  (VI)

where

R$^x$ is a —(R*)—Si(YR$^{9/10/11}$)$_3$ group where R$^9$, R$^{10}$ and R$^{11}$ are independently H, an optionally substituted straight-chain or branched C1- to C25-alkyl group, an optionally substituted straight-chain or branched C2- to C25-alkenyl group or an optionally substituted C4- to C18-cycloalkyl group or an optionally substituted C4- to C18-aryl group, R* is 0 or an optionally substituted straight-chain or branched C1- to C25-alkyl group or an optionally substituted C4- to C18-cycloalkyl group or an optionally substituted C4- to C18-aryl group, preferably an optionally substituted straight-chain or branched C1- to C15-alkyl group, and, when R*=0, the silicon atom is bonded directly to the nitrogen atom, each Y is independently either O or a direct bond of the silicon atom to the respective R$^9$, R$^{10}$ or R$^{11}$ radical, and preferably at least one Y is O, and z is at least 1, preferably 1.

For the purposes of the invention, the isocyanatosilane (Iso-Si) is preferably selected from the group consisting of the following compounds of the general formula (VII):

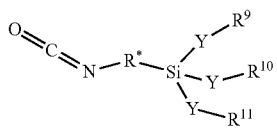  (VII)

where each Y is independently either O or a direct bond of the silicon atom to the respective R$^9$, R$^{10}$ or R$^{11}$ radical, and preferably at least one Y is 0, R$^9$, R$^{10}$ and R$^{11}$ are independently H, an optionally substituted straight-chain or branched C1- to C20-alkyl group, an optionally substituted straight-chain or branched C2- to C20-alkenyl group or an optionally substituted C4- to C14-cycloalkyl group or an optionally substituted C4- to C14-aryl group, and R* is 0 or an optionally substituted straight-chain or branched C1- to C25-alkyl group or an optionally substituted C4- to C18-cycloalkyl group or an optionally substituted C4- to C18-aryl group and, when R*=0, the silicon atom is bonded directly to the nitrogen atom.

In a further aspect of the invention, the inventive synthesis of the silylated polymers (SiP) enables the use of ethoxy-functionalized silanes, both in the AmSi route, in which the aminosilane has one or more ethoxy groups, and in the Iso-Si route, in which the isocyanatosilane has one or more ethoxy groups.

End groups according to the invention in the silylated polymer (SiP) may be described by the general formula (V)

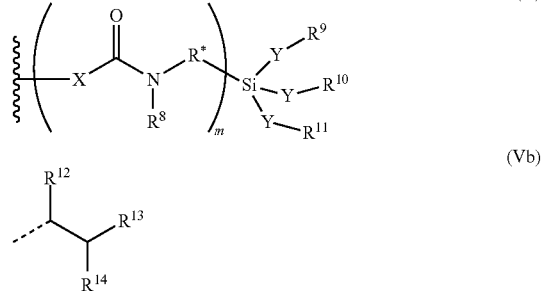

where

X is C, Si or a heteroatom and these, according to their valency, optionally have one or more R$^8$ radicals, preferably C, N, O, P, S, more preferably C, N or O, most preferably N or O, and is bonded to a carbon in the polymer backbone, R* is 0 or an optionally substituted straight-chain or branched C1- to C25-alkyl group or an optionally substituted C4- to C18-cycloalkyl group or an optionally substituted C4- to C18-aryl group, preferably an optionally substituted straight-chain or branched C1- to C15-alkyl group, and, when R*=0, the silicon atom is bonded directly to the nitrogen atom, each Y is independently either O or a direct bond of the silicon atom to the respective R$^9$, R$^{10}$ or R$^{11}$ radical, and preferably at least one Y is 0, R$^8$ is H, an optionally substituted straight-chain or branched C1- to C25-alkyl group, an optionally substituted straight-chain or branched C2- to C25-alkenyl group or an optionally substituted straight-chain or branched C2- to C18-alkynyl group, an optionally substituted C4- to C18-cycloalkyl group or an optionally substituted C4- to C18-aryl group, or a radical of the general structure (Vb), R$^{12}$ and R$^{14}$ are each independently H or a radical from the group consisting of —R$^{15}$, —COOR$^{15}$ and —CN, R$^{13}$ is H or a radical from the group consisting of —CH$_2$—COOR$^{15}$, —COOR$^{15}$, —CONHR$^{15}$, —CON(R$^{15}$), —CN, —NO$_2$, —PO(OR$^{15}$)$_2$, —SOR$^{15}$ and —SO$_2$OR$^{15}$, R$^{15}$ is a hydrocarbyl radical having 1 to 20 carbon atoms and optionally having at least one heteroatom, R$^9$, R$^{10}$ and R$^{11}$ are independently H or C1- or C2-alkyl group, preferably at least R$^9$ is a C2-alkyl group, m is 0 or 1 and, when m=0, the silicon atom is bonded directly to a carbon in the polymer backbone (P).

In a preferred embodiment, the silylated polymer (SiP) is prepared by a synthesis of at least one isocyanate-reactive compound (component A) selected from the group of compounds having NH, OH or SH functions, and one or more compounds having at least one isocyanate group, selected from the group of isocyanates (Iso) and/or isocyanatosilanes (Iso-Si), catalysed by at least one mononuclear metal-siloxane-silanol(ate) compound.

In a further preferred embodiment, the silylated polymer (SiP) is prepared by a synthesis of at least one hydroxy-functionalized polymer (component A) selected from the group of polypropylene diols, polyester polyols, or mixtures thereof, and one or more compounds having at least one isocyanate group, selected from the group of 4,4'-methylene diphenyl isocyanate (4,4'-MDI), isophorone diisocyanate (IPDI) or mixtures thereof and/or 3-(trimethoxysilyl)propyl isocyanate, 3-(triethoxysilyl)propyl isocyanate, or mixtures thereof, catalysed by at least one mononuclear single-cage metal-siloxane-silanol(ate) compound.

In a further preferred embodiment, the silylated polymer (SiP) is prepared by a synthesis of at least one hydroxy-functionalized polymer (component A) selected from the group of polypropylene diols, polyester polyols, or mixtures thereof, and one or more compounds having at least one isocyanate group, selected from the group of 4,4'-methylene diphenyl isocyanate (4,4'-MDI), isophorone diisocyanate (IPDI) or mixtures thereof and/or 3-(trimethoxysilyl)propyl isocyanate, 3-(triethoxysilyl)propyl isocyanate, or mixtures thereof, catalysed by at least one mononuclear titanium-siloxane-silanol(ate) compound, especially by heptaisobutyl POSS-titanium(IV) ethoxide (TiPOSS).

In a further alternative embodiment of all the above combinations, the silylated polymer (SiP) is prepared by reaction with an aminosilane (AmSi) selected from the group of N-[3-(trimethoxysilyl)propyl]butylamine, N-[3-(triethoxysilyl)propyl]butylamine or a mixture thereof.

In a very particularly preferred embodiment, the silylated polymer (SiP) of the composition according to the invention is prepared by a heptaisobutyl POSS-titanium(IV) ethoxide (TiPOSS)-catalysed synthesis of a component A selected from the group of the polypropylene diols, polyester polyols, or mixtures thereof, with a component B selected from the group of 3-(trimethoxysilyl)propyl isocyanate, 3-(triethoxysilyl)propyl isocyanate or mixtures thereof. In a further very particularly preferred embodiment, the silylated polymer (SiP) of the composition according to the invention is prepared by a heptaisobutyl POSS-titanium(IV) ethoxide (TiPOSS)-catalysed synthesis of a component A selected from the group of polypropylene diols, polyester polyols, or mixtures thereof, with a component B selected from the group of 4,4'-methylene diphenyl isocyanate (4,4'-MDI), isophorone diisocyanate (IPDI) or mixtures thereof, followed by silanization with an aminosilane selected from the group of N-[3-(trimethoxysilyl)propyl]butylamine, N-[3-(triethoxysilyl)propyl]butylamine or a mixture thereof.

In the most preferred embodiment, all the above combinations include heptaisobutyl POSS-titanium(IV) ethoxide (TiPOSS) as catalyst in the synthesis of the silylated polymer (SiP).

In an alternative embodiment, all the above combinations in the embodiments, rather than heptaisobutyl POSS-titanium(IV) ethoxide (TiPOSS) in the synthesis of the silylated polymer (SiP), include heptaisobutyl POSS-tin(IV) ethoxide (SnPOSS) or a mixture of two catalysts. In what is, however, the most preferred embodiment, heptaisobutyl POSS-titanium(IV) ethoxide (TiPOSS) only is present as catalyst in the synthesis of the silylated polymer (SiP).

The composition of the invention in all the above combinations, in a preferred embodiment, includes a further catalyst selected from metal-siloxane-silanol(ate) compounds, especially heptaisobutyl POSS-titanium(IV) ethoxide (TiPOSS) or heptaisobutyl POSS-tin(IV) ethoxide (SnPOSS), dibutyltin dilaurate (DBTL) or mixtures thereof.

In a particularly preferred embodiment, all the above combinations of the composition of the invention include dibutyltin dilaurate (DBTL) as second catalyst.

In a further-preferred embodiment, this comprises additives from the group comprising one or more fillers selected from the group of inorganic and organic fillers, especially natural, ground or precipitated calcium carbonates optionally coated with fatty acids, especially stearic acid, barite (heavy spar), talcs, quartz flours, quartz sand, dolomites, wollastonites, kaolins, calcined kaolins, mica (potassium aluminium silicate), molecular sieves, aluminium oxides, aluminium hydroxides, magnesium hydroxide, silicas including finely divided silicas from pyrolysis processes, industrially produced carbon blacks, graphite, metal powders such as aluminium, copper, iron, silver or steel, PVC powders or hollow beads, one or more adhesion promoters from the group of the silanes, especially aminosilanes such as 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl) propyl]ethylenediamine and analogues thereof having ethoxy or isopropoxy in place of the methoxy groups on the silicon, aminosilanes having secondary amino groups, such as, in particular, N-phenyl-, N-cyclohexyl- and N-alkylaminosilanes, and also mercaptosilanes, epoxysilanes, (meth)acryloylsilanes, anhydridosilanes, carbamatosilanes, alkylsilanes and iminosilanes, and oligomeric forms of these silanes, and adducts of primary aminosilanes with epoxysilanes or (meth)acryloylsilanes or anhydridosilanes. Especially suitable are 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-mercaptopropyltrimethoxysilane, 3-ureidopropyltrimethoxysilane and the corresponding silanes having ethoxy groups in place of the methoxy groups, and oligomeric forms of these silanes, one or more moisture scavengers from the group of silanes, especially tetraethoxysilane, vinyltrimethoxy- or vinyltriethoxysilane or organoalkoxysilanes having a functional group in the a position to the silane group, especially N-(methyldimethoxysilylmethyl)-O-methyl carbamate, (methacryloyloxymethyl)silanes, methoxymethylsilanes, orthoformic esters, and calcium oxide or molecular sieves, one or more plasticizers from the group of carboxylic esters, such as phthalates, especially diisononyl cyclohexane-1,2-dicarboxylate, dioctyl phthalate, diisononyl phthalate or diisodecyl phthalate, adipates, especially dioctyl adipate, azelates, sebacates, polyols, especially polyoxyalkylene polyols or polyester polyols, glycol ethers, glycol esters, citrates, especially triethyl citrate, organic phosphoric and sulfonic esters, polybutenes, or fatty acid methyl or ethyl esters derived from natural fats or oils, one or more UV stabilizers from the group of organic (benzophenones, benzotriazoles, oxalanilides, phenyltriazines) and inorganic (titanium dioxide, iron oxide, zinc oxide) UV absorbers, and antioxidants from the group of sterically hindered phenols, amines, phosphites and phosphonites, one or more thixotropic agents from the group of sheet silicates such as bentonites, derivatives of castor oil, hydrogenated castor oil, polyamides, polyurethanes, urea compounds, fumed silicas, cellulose ethers or hydrophobically modified polyoxyethylenes, one or more wetting agents from the group of nonionic, anionic and cationic surfactants, or combinations of these.

In a further preferred embodiment, the composition of the invention additionally includes a water scavenger, preferably a vinylalkoxysilane, more preferably vinyltrimethoxysilane (VTMO). It is always possible here that the alkoxy substituents (e.g. methoxy or ethoxy) of the alkoxysilanes in the composition of at least one silylated polymer (SiP) can undergo mutual exchange with at least one water scavenger.

A preferred process for producing the composition comprises the following steps:
(i) synthesizing a polymer or a silylated polymer (SiP) at a temperature of <80° C., preferably at <60° C., especially preferably at room temperature, by combining at least one hydroxy-functionalized polymer selected from the group consisting of polypropylene diols, polyester polyols, or mixtures thereof, preferably having number-average molar masses (Mn) of 500-35 000 g/mol, more preferably with about 2000 g/mol or about 19 000 g/mol or mixtures thereof with one or more isocyanates (Iso) selected from the group consisting of 4,4'-methylene diphenyl isocyanate (4,4'-MDI), isophorone diisocyanate (IPDI) or mixtures thereof and/or one or more isocyanatosilanes (Iso-Si) selected from the group consisting of 3-(trimethoxysilyl)propyl isocyanate, 3-(triethoxysilyl)propyl isocyanate or mixtures thereof, using a metal-siloxane-silanol(ate) compound, especially heptaisobutyl POSS-titanium(IV) ethoxide (TiPOSS), heptaisobutyl POSS-tin(IV) ethoxide (SnPOSS) or mixtures thereof, (ii) optionally reacting the polymer obtained from step (i) with an aminosilane (AmSi) selected from the group of N-[3-(triethoxysilyl)propyl]butylamine, or N-[3-(trimethoxysilyl)propyl]butylamine or mixtures thereof to give the silylated polymer (SiP), (iii) optionally admixing the silylated polymer (SiP) from step (i) or (ii) with a further catalyst selected from dibutyltin dilaurate (DBTL), heptaisobutyl POSS-titanium(IV) ethoxide (TiPOSS), heptaisobutyl POSS-tin (IV) ethoxide (SnPOSS) or mixtures thereof, preferably heptaisobutyl POSS-titanium(IV) ethoxide (TiPOSS).

In the inventive preparation of the silylated polymers (SiP), either the entirety of the isocyanate-containing compound (component B) or else the entirety of the isocyanate-reactive compound, especially the hydroxy-functionalized polymer (component A) is first initially charged, then the respective other component A or B is added, followed by addition of at least one metal-siloxane-silanol(ate) compound, and the components are left to react with one another. The end product is optionally then prepared from the resulting intermediate by reaction with the aminosilane (AmSi). If one or more components are used in addition, these may in principle be added to the reaction mixture at any time.

The process according to the invention is preferably conducted at temperatures of at least 0° C., more preferably at least 20° C., and preferably at most 150° C., especially at most 80° C.

The process according to the invention is preferably conducted with exclusion of (air) humidity and at the pressure of the surrounding atmosphere, i.e. about 900 to 1100 hPa.

The process according to the invention can be effected continuously, for example in a tubular reactor or stirred reactor having multiple metering sites in parallel or else in series, or batchwise, for example in a conventional reaction tank with stirrer system.

Particularly Preferred Embodiments of the Invention

1. Composition comprising at least one silylated polymer (SiP) obtainable by a synthesis, catalysed by a metal-siloxane-silanol(ate) compound, of at least one isocyanate-reactive compound, especially at least one hydroxy-functionalized polymer (component A), and one or more compounds having at least one isocyanate group (component B).

2. Composition according to Embodiment 1, characterized in that the metal-siloxane-silanol(ate) compound is in the form of a monomer, oligomer and/or polymer, where the metal(s) are present terminally and/or within the chain.

3. Composition according to Embodiment 1 or 2, characterized in that the metal-siloxane-silanol(ate) compound has the general formula $R^*_q Si_r O_s M_t$ where each R* is independently selected from the group consisting of optionally substituted C1- to C20-alkyl, optionally substituted C3- to C6-cycloalkyl, optionally substituted C2- to C20-alkenyl, optionally substituted C6- to C10-aryl, —OH and —O—(C1- to C10-alkyl), each M is independently selected from the group consisting of s- and p-block metals, d- and f-block transition metals, lanthanide and actinide metals and semimetals, especially from the group consisting of metals of transition groups 1, 2, 3, 4, 5, 8, 10 and 11 and metals of main groups 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, q is an integer from 4 to 19,
r is an integer from 4 to 10,
s is an integer from 8 to 30, and
t is an integer from 1 to 8.

4. Composition according to any of the preceding embodiments, characterized in that the metal-siloxane-silanol(ate) compound has a general structure (I)

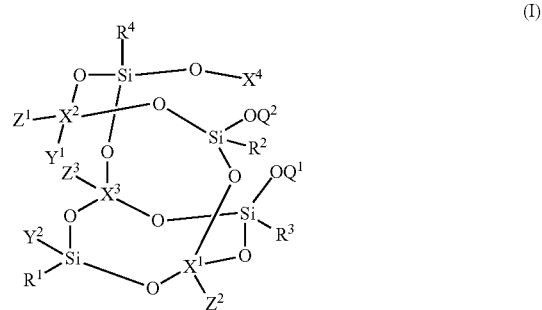

where
$X^1$, $X^2$ and $X^3$ are independently selected from Si and $M^1$, where $M^1$ is selected from the group consisting of s- and p-block metals, d- and f-block transition metals, lanthanide and actinide metals and semimetals, especially from the group consisting of metals of transition groups 1, 2, 3, 4, 5, 8, 10 and 11 and metals of main groups 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, $Z^1$, $Z^2$ and $Z^3$ are independently selected from the group consisting of $L^2$, $R^5$, $R^6$ and $R^7$, where $L^2$ is selected from the group consisting of —OH and —O—(C1- to C10-alkyl), especially —O—(C1- to C8-alkyl) or —O—(C1- to C6-alkyl), or where $L^2$ is selected from the group consisting of —OH, —O-methyl, —O-ethyl, —O-propyl, —O-butyl, —O-octyl, —O-isopropyl, and —O— isobutyl;

$R^1$, $R^2$, $R^3$, $R^4$, $R^5$, $R^6$ and $R^7$ are independently selected from the group consisting of optionally substituted C1- to C20-alkyl, optionally substituted C3- to C8-cycloalkyl, optionally substituted C2- to C20-alkenyl and optionally substituted C5- to C10-aryl;

$Y^1$ and $Y^2$ are independently —O-$M^2$-$L^3_A$, or $Y^1$ and $Y^2$ are associated and together are —O-$M^2(L^3_A)$-O— or —O—, where $L^3$ is selected from the group consisting of —OH and —O—(C1- to C10-alkyl), especially —O—(C1- to C8-alkyl) or —O—(C1- to C6-alkyl), or where L³ is selected from the group consisting of —OH, —O-methyl, —O-ethyl, —O-propyl, —O-butyl, —O-octyl, —O— isopropyl, and —O-isobutyl, and where M² is selected from the group consisting of s- and p-block metals, d- and f-block transition metals, lanthanide and actinide metals and semimetals, especially from the group consisting of metals of transition groups 1, 2, 3, 4, 5, 8, 10 and 11 and metals of main groups 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and $X^4$ is -$M^3L^1_A$ or $M^3$ and $Q^1$ and $Q^2$ are H or each is a single bond joined to $M^3$, where $L^1$ is selected from the group consisting of —OH and —O—(C1- to C10-alkyl), especially —O—(C1- to C8-alkyl) or —O—(C1- to C6-alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s- and p-block metals, d- and f-block transition metals, lanthanide and actinide metals and semimetals, especially from the group consisting of metals of transition groups 1, 2, 3, 4, 5, 8, 10 and 11 and metals of main groups 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, or $X^4$ is -$M^3L^1_A$ and $Q^2$ is H or a single bond joined to $M^3$ and $Q^1$ is H, $M^4L^4_A$ or —$SiR^8$, where $M^4$ is selected from the group consisting of s- and p-block metals, d- and f-block transition metals, lanthanide and actinide metals and semimetals, especially from the group consisting of metals of transition groups 1, 2, 3, 4, 5, 8, 10 and 11 and metals of main groups 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, and where $L^4$ is selected from the group consisting of —OH and —O—(C1- to C10-alkyl), especially —O—(C1- to C8-alkyl) or —O—(C1- to C6-alkyl), or where $L^4$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1- to C20-alkyl, optionally substituted C3- to C8-cycloalkyl, optionally substituted C2- to C20-alkenyl and optionally substituted C5- to C10-aryl, or $X^4$, $Q^1$ and $Q^2$ are independently -$M^3L^1_A$, or $X^4$ is —$Si(R^8)$—O-$M^3L^1_A$, $Q^2$ is a single bond joined to the silicon atom of $X^4$ and $Q^1$ is -$M^4L^4_A$, or $X^4$ is —$Si(R^8)$—O-$M^3L^1_A$, $Q^2$ is a single bond joined to the silicon atom of $X^4$ and $Q^1$ is a single bond joined to the $M^3$ atom of $X^4$.

5. Composition according to any of the preceding embodiments, characterized in that the metal-siloxane-silanol(ate) compound has the structural formula (II)

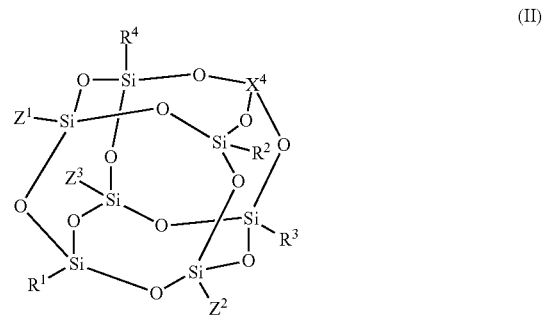

(II)

where $X^4$, $R^1$, $R^2$, $R^3$, $R^4$, $Z^1$, $Z^2$ and $Z^3$ are defined according to embodiment 4.

6. Composition according to Embodiment 5, characterized in that the metal-siloxane-silanol(ate) compound of the structure (IV) is a metal silsesquioxane

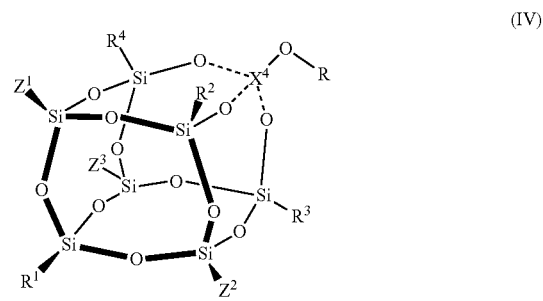

(IV)

where $X^4$ is selected from the group consisting of metals of transition groups 1, 2, 3, 4, 5, 8, 10 and 11 and metals of main groups 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, most preferably from the group consisting of Ti and Sn, and is most preferably Ti, and $X^4$ is joined to OR where R is selected from the group consisting of —H, -methyl, -ethyl, -propyl, -butyl, -octyl, -isopropyl, and -isobutyl, $Z^1$, $Z^2$ and $Z^3$ are each independently C1- to C20-alkyl, C3- to C8-cycloalkyl, C2- to C20-alkenyl and C5- to C10-aryl, especially selected from the group consisting of methyl, ethyl, propyl, isopropyl, butyl, isobutyl, hexyl, heptyl, octyl, vinyl, allyl, butenyl and phenyl, and benzyl, and $R^1$, $R^2$, $R^3$ and $R^4$ are each independently C1- to C20-alkyl, C3- to C8-cycloalkyl, C2- to C20-alkenyl, and C5- to C10-aryl, especially selected from the group consisting of methyl, ethyl, propyl, isopropyl, butyl, isobutyl, hexyl, heptyl, octyl, vinyl, allyl, butenyl and phenyl, and benzyl.

7. Composition according to Embodiment 6, characterized in that the metal-siloxane-silanol(ate) compound is a metal silsesquioxane of the structure (IVb)

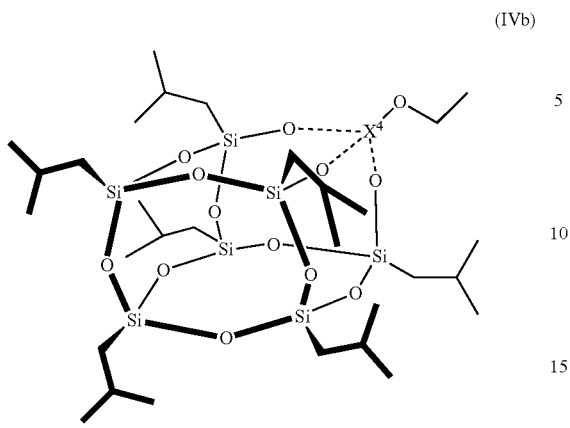

(IVb)

where X⁴ is selected from the group consisting of metals of transition groups 1, 2, 3, 4, 5, 8, 10 and 11 and metals of main groups 1, 2, 3, 4 and 5, preferably from the group consisting of Na, Zn, Sc, Nd, Ti, Zr, Hf, V, Fe, Pt, Cu, Ga, Sn and Bi; especially preferably from the group consisting of Zn, Ti, Zr, Hf, V, Fe, Sn and Bi, most preferably from the group consisting of Ti (and therefore is heptaisobutyl POSS-titanium(IV) ethoxide (TiPOSS)) and Sn (and therefore is heptaisobutyl POSS-tin(IV) ethoxide (SnPOSS)), and is most preferably Ti (and therefore is heptaisobutyl POSS-titanium(IV) ethoxide (TiPOSS)).

8. Composition according to any of the preceding embodiments, characterized in that the polymer backbone (P) of the silylated polymer (SiP) has constituents selected from the group consisting of polyurethanes, polyureas, polyethers, polyesters, phenolic resins, polyalkylenes, poly(meth)acrylates, polyamides, polycaprolactones, polybutadienes or polyisoprenes, and polycarbonates or mixtures thereof, preferably from the group consisting of polyurethanes, polyureas, poly(meth)acrylates or polyethers or mixtures thereof, most preferably polyethers.

9. Composition according to any of the preceding embodiments, characterized in that the silylated polymer (SiP) has at least two end groups of the general formula (V)

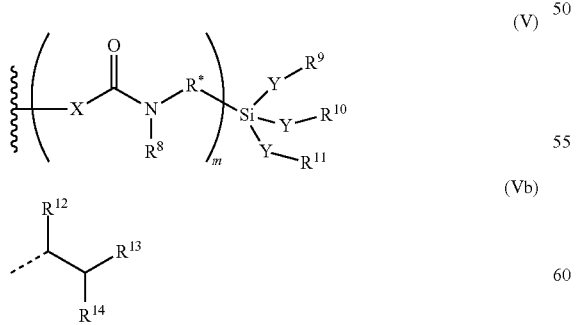

(V)

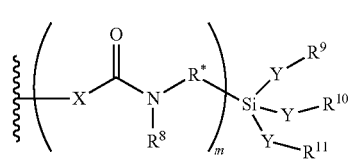

(Vb)

where
X is C, Si or a heteroatom and these, according to their valency, optionally have one or more R⁸ radicals, preferably C, N, O, P, S, more preferably C, N or O, most preferably N or O, and each is bonded to a carbon in the polymer backbone, R* is 0 or an optionally substituted straight-chain or branched C1- to C25-alkyl group or an optionally substituted C4- to C18-cycloalkyl group or an optionally substituted C4- to C18-aryl group and, when R*=0, the silicon atom is bonded directly to the nitrogen atom, each Y is independently either O or a direct bond of the silicon atom to the respective $R^9$, $R^{10}$ or $R^{11}$ radical, and preferably at least one Y is O, $R^8$ is H, an optionally substituted straight-chain or branched C1- to C16-alkyl group, an optionally substituted straight-chain or branched C2- to C16-alkenyl group or an optionally substituted straight-chain or branched C2- to C16-alkynyl group, an optionally substituted C4- to C14-cycloalkyl group or an optionally substituted C4- to C14-aryl group, or a radical of the general structure (Vb), $R^{12}$ and $R^{14}$ are each independently H or a radical from the group consisting of —$R^{15}$, —COO$R^{15}$ and —CN, $R^{13}$ is H or a radical from the group consisting of —CH$_2$—COO$R^{15}$, —COO$R^{15}$, —CONH$R^{15}$, —CON($R^{15}$), —CN, —NO$_2$, —PO(O$R^{15}$)$_2$, —SO$R^{15}$ and —SO$_2$O$R^{15}$, $R^{15}$ is a hydrocarbyl radical having 1 to 20 carbon atoms and optionally having at least one heteroatom, $R^9$, $R^{10}$ and $R^{11}$ are independently H, an optionally substituted straight-chain or branched C1- to C5-alkyl group, an optionally substituted straight-chain or branched C2- to C10-alkenyl group or an optionally substituted C4- to C14-cycloalkyl group or an optionally substituted C4- to C14-aryl group, m is 0 or 1 and, when m=0, the silicon atom is bonded directly to a carbon in the polymer backbone (P).

10. Composition according to Embodiment 9, characterized in that the silylated polymer (SiP) has a polyether polymer backbone having at least two end groups of the general formula (V)

(V)

where
X is N or O and N optionally has an $R^8$ radical,
R* is 0 or an optionally substituted straight-chain or branched C1- to C20-alkyl group or an optionally substituted C4- to C12-cycloalkyl group or an optionally substituted C4- to C12-aryl group, preferably an optionally substituted straight-chain or branched C1- to C15-alkyl group, and, when R*=0, the silicon atom is bonded directly to the nitrogen atom,
Y in Y—$R^9$ and Y—$R^{10}$ are O and the Y in Y—$R^{11}$ is either O or a direct bond of the silicon atom to the respective $R^{11}$ radical, R⁸ is H, an optionally substituted straight-chain or branched C1- to C10-alkyl group, an optionally substituted straight-chain or branched C2- to C10-alkenyl group or an optionally substituted straight-chain or branched C2- to C10-alkynyl group, an optionally substituted C4- to C10-cycloalkyl group or an optionally substituted C4- to C10-aryl group or a succinic acid derivative of the general structure (Vb) according to Embodiment 9, R⁹, R¹⁰ and R¹¹ are independently H, an optionally substituted straight-chain or branched C1- to C4-alkyl group, an optionally substituted straight-chain or branched C2- to C5-alkenyl group or an optionally substituted C4- to C10-cycloalkyl group or an optionally substituted C4- to C10-aryl group, preferably independently H or a C1- to C2-alkyl group, and m is 0 or 1 and, when m=0, the silicon atom is bonded directly to a carbon in the polymer backbone (P), preferably m=1.

11. Composition according to Embodiment 10, characterized in that the silylated polymer (SiP) has a polyether polymer backbone having at least two end groups of the general formula (V)

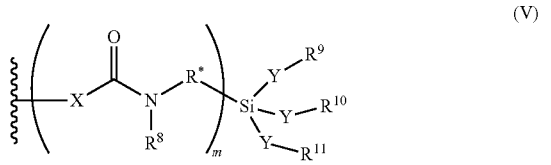

where
R* is 0 or an optionally substituted straight-chain or branched C1- to C15-alkyl group or an optionally substituted C4- to C6-cycloalkyl group or an optionally substituted C4- to C6-aryl group, preferably an optionally substituted straight-chain or branched C1- to C10-alkyl group, more preferably a C1-alkyl group (=alpha-silane) or a C3-alkyl group (=gamma-silane), and, when R*=0, the silicon atom is bonded directly to the nitrogen atom, R⁸ is H, an optionally substituted straight-chain or branched C1- to C8-alkyl group, an optionally substituted straight-chain or branched C2- to C8-alkenyl group or an optionally substituted straight-chain or branched C2- to C8-alkynyl group, an optionally substituted C4- to C6-cycloalkyl group or an optionally substituted C4- to C6-aryl group, R⁹, R¹⁰ and R¹¹ are independently H, an optionally substituted, straight-chain or branched C1- to C4-alkyl group, an optionally substituted, straight-chain or branched C2- to C5-alkenyl group or an optionally substituted C4- to C6-cycloalkyl group or an optionally substituted C4- to C6-aryl group, preferably independently H or a C1- to C2-alkyl group, and m is 0 or 1 and, when m=0, the silicon atom is bonded directly to a carbon in the polymer backbone (P), preferably m=1.

12. Composition according to any of the preceding embodiments, characterized in that the hydroxy-functionalized polymer is selected from the group consisting of polyoxyalkylene diols or polyoxyalkylene triols, especially polyoxyethylene di- and triols and polyoxypropylene di- and triols, higher-functionality polyols such as sorbitol, pentaerythritol-started polyols, ethylene oxide-terminated polyoxypropylene polyols, polyester polyols, styrene-acrylonitrile, acryloyl-methacrylate, (poly)urea-grafted or -containing polyether polyols, polycarbonate polyols, $CO_2$ polyols, polyhydroxy-functional fats and oils, especially castor oil, polyhydrocarbon polyols such as dihydroxypolybutadiene, polytetrahydrofuran-based polyethers (PT-MEG), OH-terminated prepolymers based on the reaction of a polyetherol or polyesterol with a diisocyanate, polypropylene diols, polyester polyols or mixtures thereof, preferably polypropylene diols, polyester polyols, or mixtures thereof.

13. Composition according to Embodiment 12, characterized in that the hydroxy-functionalized polymer is selected from the group consisting of polyoxyalkylene diols, polyoxyalkylene triols, especially polyoxyethylene di- and/or triols and/or polyoxypropylene di- and/or triols, KOH-catalysed hydroxy-functionalized polyethers or double metal cyanide complex-catalysed (DMC-catalysed) hydroxy-functionalized polyethers or mixtures thereof.

14. Composition according to any of the preceding embodiments, characterized in that component B is selected from the group consisting of aromatic and/or aliphatic isocyanates (Iso) of the general structure (VI) or mixtures thereof or isocyanatosilanes (Iso-Si) of the general structure (VII) or mixtures thereof

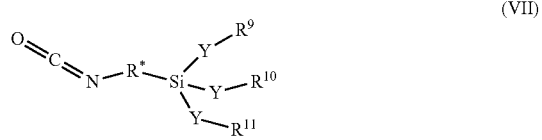

where
R^x is a carbon-containing group, preferably at least one aromatic or aliphatic group or mixtures thereof, more preferably an optionally substituted straight-chain or branched C1- to C16-alkyl group, an optionally substituted straight-chain or branched C2- to C16-alkenyl group or an optionally substituted straight-chain or branched C2- to C16-alkynyl group, an optionally substituted C4- to C14-cycloalkyl group or an optionally substituted C4- to C14-aryl group, most preferably diphenylmethane, toluene, dicyclohexylmethane, hexane or methyl-3,5,5-trimethylcyclohexyl, each Y is independently either O or a direct bond of the silicon atom to the respective R⁹, R¹⁰ or R¹¹ radical, and preferably at least one Y is O, z is at least 1, preferably at least 2, R⁹, R¹⁰ and R¹¹ are independently H, an optionally substituted straight-chain or branched C1- to C5-alkyl group, an optionally substituted straight-chain or branched C2- to C10-alkenyl group or an optionally substituted C4- to C8-cycloalkyl group or an optionally substituted C4- to C8-aryl group and R* is 0 or an optionally substituted straight-chain or branched C1- to C25-alkyl group or an optionally substituted C4- to C18-cycloalkyl group or an optionally substituted C4- to C18-aryl group and, when R*=0, the silicon atom is bonded directly to the nitrogen atom.

15. Composition according to any of the preceding embodiments, characterized in that component B is selected from the group consisting of aromatic and/or aliphatic isocyanates (Iso) of the general structure (VI) or mixtures thereof or isocyanatosilanes (Iso-Si) of the general structure (VII) or mixtures thereof

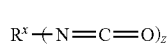
(VI)

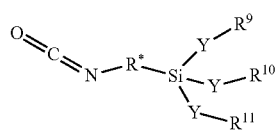
(VII)

where
R$^x$ is diphenylmethane, toluene, dicyclohexylmethane, hexane or methyl-3,5,5-trimethylcyclohexyl, preferably diphenylmethane or hexane or methyl-3,5,5-trimethylcyclohexyl, most preferably diphenylmethane or methyl-3,5,5-trimethylcyclohexyl, and
z is at least 2, preferably 2,
Y in Y—R$^9$ and Y—R$^{10}$ are O and the Y in Y—R$^{11}$ is either O or a direct bond of the silicon atom to the respective R$^{11}$ radical,
R$^9$, R$^{10}$ and R$^{11}$ are independently H, an optionally substituted straight-chain or branched C1- to C3-alkyl group and
R* is 0 or an optionally substituted straight-chain or branched C1- to C15-alkyl group or an optionally substituted C4- to C6-cycloalkyl group or an optionally substituted C4- to C6-aryl group, preferably an optionally substituted straight-chain or branched C1- to C10-alkyl group, more preferably a C1-alkyl group (=alpha-silane) or a C3-alkyl group (=gamma-silane), and, when R*=0, the silicon atom is bonded directly to the nitrogen atom.

16. Composition according to Embodiment 15, characterized in that at least one isocyanate (Iso) of the general structure (VI) is selected from the group consisting of polymeric, oligomeric and monomeric methylene diphenyl isocyanate (MDI), especially from 4,4'-methylene diphenyl isocyanate (4,4'-MDI), 2,4'-methylene diphenyl isocyanate (2,4'-MDI), 2,2'-methylene diphenyl isocyanate (2,2'-MDI), 4,4'-diisocyanatodicyclohexylmethane (H12MDI), 2-methylpentamethylene 1,5-diisocyanate, dodecamethylene 1,12-diisocyanate, lysine and lysine ester diisocyanate, cyclohexane 1,3-diisocyanate, cyclohexane 1,4-diisocyanate, perhydro(diphenylmethane 2,4'-diisocyanate), perhydro(diphenylmethane 4,4'-diisocyanate), 1,4-diisocyanato-2,2,6-trimethylcyclohexane (TMCDI), 3-isocyanatomethyl-3,5,5-trimethylcyclohexyl isocyanate (=isophorone diisocyanate or IPDI), hexamethylene 1,6-diisocyanate (HDI) or the trimer thereof (HDI trimer), 2,2,4- and/or 2,4,4-trimethylhexamethylene 1,6-diisocyanate, 1,4-bis(isocyanato)cyclohexane, 1,4-bis(isocyanato)benzene (PPDI), 1,3- and/or 1,4-bis(isocyanatomethyl)cyclohexane, m- and/or p-xylylene diisocyanate (m- and/or p-XDI), m- and/or p-tetramethylxylylene 1,3-diisocyanate, m- and/or p-tetramethylxylylene 1,4-diisocyanate, bis(1-isocyanato-1-methylethyl)naphthalene, 1,3-bis(isocyanato-4-methylphenyl)-2,4-dioxo-1,3-diazetidine, naphthalene 1,5-diisocyanate (NDI), 3,3'-dimethyl-4,4'-diisocyanatodiphenyl (TODI), tolylene 2,4- and/or 2,6-diisocyanate (TDI), 1,3-bis(isocyanatomethyl)benzene or mixtures thereof, preferably 4,4'-methylene diphenyl isocyanate (4,4'-MDI) or isophorone diisocyanate (IPDI), hexamethylene 1,6-diisocyanate (HDI) or the trimer thereof (HDI trimer) or mixtures thereof, most preferably 4,4'-methylene diphenyl isocyanate (4,4'-MDI) or isophorone diisocyanate (IPDI) or mixtures thereof.

17. Composition according to any of the preceding embodiments, characterized in that at least one isocyanatosilane (Iso-Si) of the general structure (VII) is selected, or mixtures thereof,

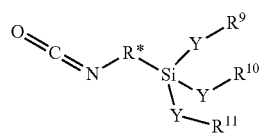
(VII)

where R$^9$, R$^{10}$, R$^{11}$ and R* are as defined in Embodiment 14 or 15, preferably R$^9$, R$^{10}$, R$^{11}$ are a methyl or ethyl group or mixtures thereof, preferably selected from the group consisting of 3-(triethoxysilyl)methyl isocyanate, 3-(trimethoxysilyl)methyl isocyanate, 3-(triethoxysilyl)ethyl isocyanate, 3-(trimethoxysilyl)ethyl isocyanate, 3-(triethoxysilyl)propyl isocyanate, 3-(trimethoxysilyl)propyl isocyanate, 3-(triethoxysilyl)butyl isocyanate, 3-(trimethoxysilyl)butyl isocyanate, 3-(triethoxysilyl)pentyl isocyanate, 3-(trimethoxysilyl)pentyl isocyanate, 3-(triethoxysilyl)hexyl isocyanate, 3-(trimethoxysilyl)hexyl isocyanate or mixtures thereof, preferably 3-(trimethoxysilyl)methyl isocyanate, 3-(triethoxysilyl)methyl isocyanate, 3-(trimethoxysilyl)propyl isocyanate, 3-(triethoxysilyl)propyl isocyanate or mixtures thereof, more preferably 3-(trimethoxysilyl)propyl isocyanate, 3-(triethoxysilyl)propyl isocyanate, or mixtures thereof.

18. Composition according to any of the preceding embodiments, characterized in that the silylated polymer (SiP) has been prepared by reaction with an aminosilane (AmSi).

19. Composition according to any of the preceding embodiments, characterized in that at least one aminosilane (AmSi) of the general structure (VIII) is selected, or a mixture thereof,

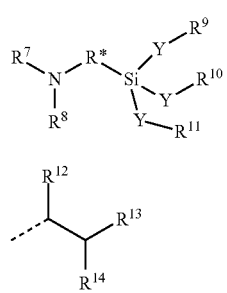
(VIII)

(Vb)

where
- $R^7$ is H,
- $R^8$ is H, an optionally substituted straight-chain or branched C1- to C25-alkyl group, an optionally substituted straight-chain or branched C2- to C25-alkenyl group or an optionally substituted C4- to C18-cycloalkyl group or an optionally substituted C4- to C18-aryl group, or a radical of the general structure (Vb),
- R* is 0 or an optionally substituted straight-chain or branched C1- to C25-alkyl group or an optionally substituted C4- to C18-cycloalkyl group or an optionally substituted C4- to C18-aryl group and, when R*=0, the silicon atom is bonded directly to the nitrogen atom,
- $R^{12}$ and $R^{14}$ are each independently H or a radical from the group consisting of —$R^{15}$, —COOR$^{15}$ and —CN,
- $R^{13}$ is H or a radical from the group consisting of —CH$_2$—COOR$^{15}$, —COOR$^{15}$, —CONHR$^{15}$, —CON(R$^{15}$), —CN, —NO$_2$, —PO(OR$^{15}$)$_2$, —SOR$^{15}$ and —SO$_2$OR$^{15}$,
- $R^{15}$ is a hydrocarbyl radical having 1 to 20 carbon atoms and optionally having at least one heteroatom,
- $R^9$, $R^{10}$, $R^{11}$ and R* are defined according to Embodiment 10 or 11 and
- each Y is independently either O or a direct bond of the silicon atom to the respective $R^9$, $R^{10}$ or $R^{11}$ radical, and preferably at least one Y is O.

20. Composition according to any of the preceding embodiments, characterized in that at least one aminosilane (AmSi) of the general structure (VIII) is selected, or a mixture thereof,

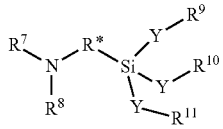

(VIII)

where
- $R^8$ is H, an optionally substituted straight-chain or branched C1- to C10-alkyl group, an optionally substituted straight-chain or branched C2- to C10-alkenyl group or an optionally substituted straight-chain or branched C2- to C10-alkynyl group, an optionally substituted C4- to C10-cycloalkyl group or an optionally substituted C4- to C10-aryl group or a succinic acid derivative of the general structure (Vb) according to Embodiment 19,
- R* is 0 or an optionally substituted straight-chain or branched C1- to C20-alkyl group or an optionally substituted C4- to C12-cycloalkyl group or an optionally substituted C4- to C12-aryl group, preferably an optionally substituted straight-chain or branched C1- to C15-alkyl group, more preferably a C1-alkyl group (=alpha-silane) or a C3-alkyl group (=gamma-silane), and, when R*=0, the silicon atom is bonded directly to the nitrogen atom,
- $R^9$, $R^{10}$, $R^{11}$ are defined according to Embodiment 10 or 11, preferably $R^9$, $R^{10}$, $R^{11}$ are a methyl or ethyl group or mixtures thereof, and Y in Y—$R^9$ and Y—$R^{10}$ are O and the Y in Y—$R^{11}$ is either O or a direct bond of the silicon atom to the respective $R^{11}$ radical.

21. Composition according to any of the preceding embodiments, characterized in that the aminosilane (AmSi) of the general structure (VIII) is selected from the group of N-[3-(trimethoxysilyl)methyl]butylamine, N-[3-(triethoxysilyl)methyl]butylamine, N-[3-(trimethoxysilyl)ethyl]butylamine, N-[3-(triethoxysilyl)ethyl]butylamine, N-[3-(trimethoxysilyl)propyl]butylamine, N-[3-(triethoxysilyl)propyl]butylamine, N-[3-(trimethoxysilyl)butyl]butylamine, N-[3-(triethoxysilyl)butyl]butylamine, N-[3-(trimethoxysilyl)pentyl]butylamine, N-[3-(triethoxysilyl)pentyl]butylamine, N-[3-(trimethoxysilyl)hexyl]butylamine, N-[3-(triethoxysilyl)hexyl]butylamine, 3-aminopropyltrimethoxysilane, 3-aminopropyltriethoxysilane, N-cyclohexyl-3-aminopropyltrimethoxysilane, N-cyclohexyl-3-aminopropyltriethoxysilane, N-(3-trimethoxysilylpropyl)aminosuccinic acid diethyl ester, N-(3-triethoxysilylpropyl)aminosuccinic acid diethyl ester or a mixture thereof, preferably N-[3-(trimethoxysilyl)methyl]butylamine, N-[3-(triethoxysilyl)methyl]butylamine, N-[3-(trimethoxysilyl)propyl]butylamine, N-[3-(triethoxysilyl)propyl]butylamine, N-(3-trimethoxysilylpropyl)aminosuccinic acid diethyl ester, N-(3-triethoxysilylpropyl)aminosuccinic acid diethyl ester, more preferably N-[3-(trimethoxysilyl)propyl]butylamine, N-[3-(triethoxysilyl)propyl]butylamine, N-[3-(triethoxysilyl)methyl]butylamine, N-[3-(trimethoxysilyl)methyl]butylamine or a mixture thereof.

22. Composition according to any of the preceding embodiments, characterized in that the metal-siloxane-silanol(ate) compound is present in a molar concentration in the range from 0.000001 to 0.001 mol/kg or 0.0001 to 0.1 mol/kg, especially from 0.000028 to 0.00014 mol/kg or 0.001 to 0.01 mol/kg, based in each case on the total weight of the composition.

23. Composition according to any of the preceding embodiments, characterized in that the metal-siloxane-silanol(ate) compound is present with a proportion by weight of 0.001% to 1.5%, preferably of 0.002% to 0.5%, based in each case on the total weight of the composition.

24. Composition according to any of the preceding embodiments, characterized in that the silylated polymer (SiP) has a viscosity in the range from 500 to 100 000 mPa·s, preferably in the range from 2000 to 25 000 mPa·s.

25. Composition according to any of the preceding embodiments, characterized in that the silylated polymer (SiP) according to any of the preceding embodiments has a viscosity lower by >5% compared to a silylated polymer (SiP) prepared under dibutyltin dilaurate (DBTL) catalysis.

26. Composition according to any of the preceding embodiments, characterized in that the silylated polymer (SiP) has a number-average molar mass (Mn) between 500 and 100 000 g/mol.

27. Composition according to any of the preceding embodiments, characterized in that the silylated polymer (SiP) has a molar mass distribution (Mw/Mn) of about 1.6 or less.

28. Composition according to any of the preceding embodiments, characterized in that the composition is moisture-curing, preferably with additional use of a catalyst.
29. Composition according to any of the preceding embodiments, characterized in that it can cure through the influence of moisture and at room temperature, in the range of 10-30° C., preferably in the range of 18-25° C., more preferably at 20 to 23° C.
30. Composition according to any of the preceding embodiments, characterized in that it additionally comprises a catalyst selected from the group consisting of metal-siloxane-silanol(ate) compounds, such as heptaisobutyl POSS-titanium(IV) ethoxide (TiPOSS), heptaisobutyl POSS-tin(IV) ethoxide (SnPOSS), tetraalkyl titanates, such as tetramethyl titanate, tetraethyl titanate, tetra-n-propyl titanate, tetraisopropyl titanate, tetra-n-butyl titanate, tetraisobutyl titanate, tetra-sec-butyl titanate, tetraoctyl titanate, tetra(2-ethylhexyl) titanate, dialkyl titanates ((RO)$_2$TiO$_2$ in which R is, for example, isopropyl, n-butyl, isobutyl), such as isopropyl n-butyl titanate; titanium acetylacetonate chelates, such as diisopropoxybis(acetylacetonate) titanate, diisopropoxybis(ethylacetylacetonate) titanate, di-n-butylbis(acetylacetonate) titanate, di-n-butyl-bis(ethylacetoacetat) titanate, triisopropoxidebis(acetylacetonate) titanate, zirconium tetraalkoxides, such as zirconium tetraethoxide, zirconium tetrabutoxide, zirconium tetrabutyrate, zirconium tetrapropoxide, zirconium carboxylate, such as zirconium diacetate; zirconium acetylacetonate chelates, such as zirconium tetra(acetylacetonate), tributoxyzirconium acetylacetonate, dibutoxyzirconium (bisacetylacetonate), aluminium trisalkoxides, such as aluminium triisopropoxide, aluminium trisbutoxide; aluminium acetylacetonate chelates, such as aluminium tris(acetylacetonate) and aluminium tris(ethylacetylacetonate), organotin compounds such as dibutyltin dilaurate (DBTL), dibutyltin maleate, dibutyltin diacetate, tin(II) 2-ethylhexanoate (tin octoate), tin naphthenate, dimethyltin dineodecanoate, dioctyltin dineodecanoate, dimethyltin dioleate, dioctyltin dilaurate, dimethyl mercaptide, dibutyl mercaptide, dioctyl mercaptide, dibutyltin dithioglycolate, dioctyltin glycolate, dimethyltin glycolate, a solution of dibutyltin oxide, reaction products of zinc salts and organic carboxylic acids (carboxylates), such as zinc(II) 2-ethylhexanoate or zinc(II) neodecanoate, mixtures of bismuth carboxylates and zinc carboxylates, reaction products of bismuth salts and organic carboxylic acids, such as bismuth(III) tris(2-ethylhexanoate) and bismuth(III) tris(neodecanoate) and bismuth complexes, organolead compounds such as lead octoxide, organovanadium compounds, amine compounds such as butylamine, octylamine, dibutylamine, monoethanolamine, diethanolamine, triethanolamine, diethylenetriamine, oleylamine, cyclohexylamine, benzylamine, diethylaminopropylamine, xylylenediamine, triethylendiamine, guanidine, diphenylguanidine, 2,4,6-tris(dimethylaminomethyl)phenol, morpholine, N-methylmorpholine, 2-ethyl-4-methyl-imidazole and 1,8-diazabicylo(5.4.0)undecene-7 (DBU), salts of these amines with carboxylic acids or other acids or mixtures thereof, preferably metal-siloxane-silanol(ate) compounds, especially heptaisobutyl POSS-titanium(IV) ethoxide (TiPOSS), dibutyltin dilaurate (DBTL), tin(II) 2-ethylhexanoate (tin octoate), zinc(II) 2-ethylhexanoate, zinc(II) neodecanoate, bismuth(III) tris(2-ethylhexanoate), bismuth (III) tris(neodecanoate) or mixtures thereof, more preferably metal-siloxane-silanol(ate) compounds, especially heptaisobutyl POSS-titanium(IV) ethoxide (TiPOSS) or heptaisobutyl POSS-tin(IV) ethoxide (SnPOSS), dibutyltin dilaurate (DBTL) or mixtures thereof, most preferably heptaisobutyl POSS-titanium(IV) ethoxide (TiPOSS), heptaisobutyl POSS-tin(IV) ethoxide (SnPOSS), dibutyltin dilaurate (DBTL) or mixtures thereof.
31. Composition according to any of the preceding embodiments, wherein the composition further comprises one or more additives selected from the group comprising filler, adhesion promoter, moisture scavenger, plasticizer, UV stabilizers, thixotropic agents, wetting agents or combinations thereof, where one or more additives is/are preferably a silane.
32. Composition comprising the following components or obtainable by combining the following components:
    2 to 50 g of silylated polymer (SiP) according to any of the preceding embodiments,
    0 to 35 g of plasticizer
    5 to 65 g of chalk
    0 to 15 g of titanium dioxide
    0 to 5 g of water scavenger
    0 to 5 g of adhesion promoter, and
    0 to 2 g of a catalyst according to any of the preceding embodiments,
    based in each case on the total weight of the composition.
33. Composition according to Embodiment 32, comprising the following components or obtainable by combining the following components:
    10 to 40 g of silylated polymer (SiP) according to any of the preceding embodiments,
    5 to 30 g of plasticizer
    15 to 55 g of chalk
    1 to 10 g of titanium dioxide
    0.25 to 3 g of water scavenger
    0.25 to 3 g of adhesion promoter, and
    0 to 1 g of catalyst according to any of the preceding embodiments,
    based in each case on the total weight of the composition.
34. Composition according to Embodiment 33, comprising the following components or obtainable by combining the following components:
    15 to 35 g of silylated polymer (SiP) according to any of the preceding embodiments,
    10 to 25 g of plasticizer
    25 to 50 g of chalk
    1.5 to 5 g of titanium dioxide
    0.5 to 2 g of water scavenger
    1 to 2.5 g of adhesion promoter, and
    0 to 0.8 g of a catalyst according to any of the preceding embodiments,
    based in each case on the total weight of the composition.
35. Process for producing the composition according to any of the preceding embodiments, comprising the following steps:
    (i) synthesizing a polymer by combining at least one isocyanate-reactive compound, especially a hydroxy-functionalized polymer according to Embodiment 12 or 13, with one or more isocyanates (Iso) according to any of Embodiments 14, 15 and 16, or one or more isocyanatosilanes (Iso-Si) according to any of Embodiments 14, 15 or 17, using a metal-siloxane-silanol(ate) compound according to any of the preceding embodiments, especially heptaisobutyl POSS-titanium(IV) ethoxide (TiPOSS) according to Embodiment 6 or 7, heptaisobutyl POSS-tin(IV) ethoxide (SnPOSS) according to Embodiment 6 or 7 or mixtures thereof, (ii) optionally admixing the polymer from step (i) with a catalyst selected from dibutyltin dilaurate (DBTL) or a metal-siloxane-silanol(ate) compound according to any of the preceding claims, especially heptaisobutyl POSS-titanium(IV) ethoxide (TiPOSS) according to Embodiment 6 or 7, heptaisobutyl POSS-tin(IV) ethoxide (SnPOSS) according to Embodiment 6 or 7 or mixtures thereof.

36. Process for producing the composition according to Embodiment 33, comprising the steps of:
    (i) synthesizing a polymer by combining at least one hydroxy-functionalized polymer selected from the group consisting of hydroxy-functionalized polymers according to Embodiment 12 or 13 having number-average molar masses (Mn) of 500-35 000 g/mol, preferably of about 2000 g/mol or about 19 000 g/mol, or mixtures thereof with one or more isocyanates (Iso) according to any of Embodiments 14, 15 and 16, or one or more isocyanatosilanes (Iso-Si) according to any of Embodiments 14, 15 and 17, preferably 3-(trimethoxysilyl)propyl isocyanate or 3-(triethoxysilyl)propyl isocyanate or mixtures thereof, using a metal-siloxane-silanol(ate) compound according to any of the preceding embodiments, especially heptaisobutyl POSS-titanium(IV) ethoxide (TiPOSS) according to Embodiment 6 or 7, heptaisobutyl POSS-tin(IV) ethoxide (SnPOSS) according to Embodiment 6 or 7 or mixtures thereof,
    (ii) optionally admixing the polymer from step (i) with a catalyst selected from dibutyltin dilaurate (DBTL) or a metal-siloxane-silanol(ate) compound according to any of the preceding embodiments, especially heptaisobutyl POSS-titanium(IV) ethoxide (TiPOSS) according to Embodiment 6 or 7, heptaisobutyl POSS-tin(IV) ethoxide (SnPOSS) according to Embodiment 6 or 7 or mixtures thereof.

37. Process for producing the composition according to Embodiment 36, comprising the steps of:
    (i) synthesizing a polymer at a temperature of <80° C., preferably at a temperature of <60° C., especially preferably at room temperature, by combining at least one hydroxy-functionalized polymer selected from the group consisting of hydroxy-functionalized polymers according to Embodiment 12 or 13 having number-average molar masses (Mn) of 500-35 000 g/mol, preferably of about 2000 g/mol or about 19 000 g/mol, or mixtures thereof with one or more isocyanates (Iso) according to any of Embodiments 14, 15 and 16, or one or more isocyanatosilanes (Iso-Si) according to any of Embodiments 14, 15 and 17, preferably 3-(trimethoxysilyl)propyl isocyanate or 3-(triethoxysilyl)propyl isocyanate or mixtures thereof, using a metal-siloxane-silanol(ate) compound according to any of the preceding embodiments, especially heptaisobutyl POSS-titanium(IV) ethoxide (TiPOSS) according to Embodiment 6 or 7, heptaisobutyl POSS-tin(IV) ethoxide (SnPOSS) according to Embodiment 6 or 7 or mixtures thereof,
    (ii) optionally admixing the polymer from step (i) with a catalyst selected from dibutyltin dilaurate (DBTL) or a metal-siloxane-silanol(ate) compound according to any of the preceding embodiments, especially heptaisobutyl POSS-titanium(IV) ethoxide (TiPOSS) according to Embodiment 6 or 7, heptaisobutyl POSS-tin(IV) ethoxide (SnPOSS) according to Embodiment 6 or 7 or mixtures thereof.

38. Process for producing the composition according to Embodiment 35, 36 or 37, characterized in that the polymer obtained in each case from step (i) is reacted with an aminosilane (AmSi) according to Embodiment 19, 20 or 21, preferably with N-[3-(triethoxysilyl)propyl]butylamine, or N-[3-(trimethoxysilyl)propyl]butylamine or mixtures thereof.

39. Use of the composition according to any of the preceding embodiments in CASE sectors (coatings, adhesives, sealants and elastomers).

EXAMPLES

Example I

Preparation of the Polymers Required for the Study:
The following materials were used for the production of isocyanate prepolymers and hybrid polymers (silane-terminated prepolymers STP):
- 4,4'-methylene diphenyl isocyanate (4,4'-MDI), Alfa Aesar
- Wannate IPDI (IPDI), DKSH
- PolyU L 4000 (low monool polyoxypropylene diol, OH number 27 mg KOH/g, viscosity 1000 mPa*s), PolyU GmbH
- PolyU L 12000 (low monool polyoxypropylene diol, OH number 10 mg KOH/g, viscosity 6000 mPa*s), PolyU GmbH
- dibutyltin dilaurate (DBTL), BNT-Cat 422, 20% and 1% strength, dissolved in Hexamoll® DINCH, BASF
- heptaisobutyl POSS-titanium(IV) ethoxide (TiPOSS) TiPOSS, 20% and 1% strength, dissolved in Hexamoll® DINCH, BASF
- vinyltrimethoxysilane (VTMO), Acros Organics
- N-[3-(trimethoxysilyl)propyl]butylamine, DOG Deutsche Olfabrik
- 3-(triethoxysilyl)propyl isocyanate, Acros Organics A) Preparation of the Isocyanate Prepolymers with Different Isocyanates MDI:

A1) Prepolymer 1: Reaction of 4,4'-MDI with PolyU L 4000 and TiPOSS as Catalyst

In a reaction vessel under a nitrogen atmosphere, 31.3 g of 4,4'-methylene diphenyl isocyanate was melted at 55° C., and 250 g of PolyU L 4000 heated to 50° C. was added while stirring within 30 min. The mixture was cooled down to room temperature, and 0.625 g of a 1% TiPOSS solution (corresponding to 22 ppm of TiPOSS) in DINCH was added. After a reaction time of 3 h at room temperature, by means of titration, a content of free isocyanate groups of 1.9% by weight (calculated value: 1.9% by weight) was obtained. The viscosity of the resulting prepolymer was 5000 mPa*s.

Comparative Experiment to A1

A2) Prepolymer 2: Reaction of 4,4'-MDI with PolyU L 4000 and DBTL as Catalyst

In a reaction vessel under a nitrogen atmosphere, 31.3 g of 4,4'-methylene diphenyl isocyanate was melted at 55° C., and 250 g of PolyU L 4000 heated to 50° C. was added while stirring within 30 min. The mixture was cooled down to room temperature, and 0.625 g of a 1% DBTL solution (corresponding to 22 ppm of DBTL) in DINCH was added. After a reaction time of 3 h at room temperature, by means of titration, a content of free isocyanate groups of 1.9% by weight (calculated value: 1.9% by weight) was obtained. The viscosity of the resulting prepolymer was 22 000 mPa*s.

IPDI:

A3) Prepolymer 3: Reaction of IPDI with PolyU L 4000 and TiPOSS as Catalyst

A reaction vessel under a nitrogen atmosphere was initially charged with 250 g of PolyU L 4000, and 0.156 g of a 20% TiPOSS solution (corresponding to 122 ppm of TiPOSS) in DINCH was added while stirring. Subsequently, 27.79 g of IPDI was added dropwise within 30 min. After a reaction time of 3 h at room temperature, by means of titration, a content of free isocyanate groups of 1.9% by weight (calculated value 1.9% by weight) was obtained. The viscosity of the resulting prepolymer was 4000 mPa*s.

Comparative Experiment to A3

A4) Prepolymer 4: Reaction of IPDI with PolyU L 4000 and DBTL as Catalyst

A reaction vessel under a nitrogen atmosphere was initially charged with 250 g of PolyU L 4000, and 0.156 g of a 20% DBTL solution (corresponding to 122 ppm of DBTL) in DINCH was added while stirring. Subsequently, 27.79 g of IPDI was added dropwise within 30 min. After a reaction time of 9 h at room temperature, by means of titration, a content of free isocyanate groups of 1.9% by weight was obtained. The viscosity of the resulting prepolymer was 3500 mPa*s. The reaction was repeated at 48° C.; after a reaction time of 3 h, a content of free isocyanate groups of 1.9% (calculated value 1.9% by weight) was found; viscosity was 7000 mPa*s.

B) Preparation of the Silane-Terminated Polymers (STP), Also Called Silylated Polymers Silane-Terminated Polyols from the Reaction of Isocyanate Prepolymer (A1 to A4) with Sec-Trimethoxysilylamine (Aminosilane)

B1) Silane-Terminated Hybrid Polymer STP 1: Reaction of TiPOSS-Comprising Prepolymer 1 (from A1) with N-[3-(Trimethoxysilyl)Propyl]Butylamine To 259 g of prepolymer 1 with 0.006 g of TiPOSS under a nitrogen atmosphere at room temperature was added 27.2 g of N-[3-(trimethoxysilyl)propyl]butylamine while stirring. The reaction was ended after 2 h; it was no longer possible to detect any free isocyanate. The viscosity of the resultant silane-terminated polymer was 15 000 mPa*s. Finally, 1% VTMO was added.

Comparative Experiment to B1

B2) Silane-Terminated Polymer STP 2: Reaction of DBTL-Comprising Prepolymer (from A2) with N-[3-(trimethoxysilyl)propyl]butylamine To 264.3 g of prepolymer 2 with 0.006 g of DBTL under a nitrogen atmosphere at room temperature was added 27.6 g of N-[3-(trimethoxysilyl)propyl]butylamine while stirring. The reaction was ended after 2 h; it was no longer possible to detect any free isocyanate. The viscosity of the resultant silane-terminated polymer was 43 000 mPa*s. Finally, 1% VTMO was added.

B3) Silane-Terminated Polymer STP 3: Reaction of TiPOSS-Comprising Prepolymer 3 (from A3) with N-[3-(trimethoxysilyl)propyl]butylamine To 257.8 g of prepolymer 3 with 0.029 g of TiPOSS under a nitrogen atmosphere at room temperature was added 27.33 g of N-[3-(trimethoxysilyl)propyl]butylamine while stirring. The reaction was ended after 2 h; it was no longer possible to detect any free isocyanate. The viscosity of the resultant silane-terminated polymer was 11 000 mPa*s. Finally, 1% VTMO was added.

Comparative Experiment to B3

B4) Silane-Terminated Hybrid Polymer STP 4: Reaction of DBTL-Comprising Prepolymer 4 (from A4) with N-[3-(trimethoxysilyl)propyl]butylamine To 269.2 g of prepolymer 4 with 0.029 g of DBTL under a nitrogen atmosphere at room temperature was added 28.52 g of N-[3-(trimethoxysilyl)propyl]butylamine while stirring. The reaction was ended after 2 h; it was no longer possible to detect any free isocyanate. The viscosity of the resultant silane-terminated polymer was 17 000 mPa*s. Finally, 1% VTMO was added.

C) Silane-Terminated Hybrid Polyols from the Reaction of PolyU L 12000 with 3-(trimethoxysilyl)propyl isocyanate B5) Silane-Terminated Hybrid Polymer STP 5: Reaction of 3-(trimethoxysilyl)propyl Isocyanate and PolyU L 12000 with TiPOSS as Catalyst A reaction vessel under a nitrogen atmosphere was initially charged with 200 g of PolyU L 12000, and 5 g of a 20% TiPOSS solution (corresponding to 4700 ppm of TiPOSS) in DINCH was added while stirring. Subsequently, 7.31 g of 3-(trimethoxysilyl)propyl isocyanate was added dropwise within 30 min. The reaction was ended after 2 h; it was no longer possible to detect any free isocyanate. The viscosity of the resultant silane-terminated polymer was 8900 mPa*s. Finally, 2% VTMO was added.

Comparative Experiment to B6

B6) Silane-Terminated Hybrid Polymer STP 6: Reaction of 3-(trimethoxysilyl)propyl isocyanate and PolyU L 12000 with DBTL as Catalyst A reaction vessel under a nitrogen atmosphere was initially charged with 200 g of PolyU L 12000, and 5 g of a 20% DBTL solution (corresponding to 4700 ppm of DBTL) in DINCH was added while stirring. Subsequently, 7.31 g of 3-(trimethoxysilyl)propyl isocyanate was added dropwise within 30 min. The reaction was ended after 2 h; it was no longer possible to detect any free isocyanate. The viscosity of the resultant silane-terminated polymer was 9100 mPa*s. Finally, 2% VTMO was added.

Testing of the Curing Characteristics of the Silane-Terminated Polymers STP 1 to STP 6 from Reactions B1 to B6

The curing characteristics of the silane-terminated polymers were tested by determining the fibre time FT and tack-free time TFT on samples of thickness 2 mm at 23° C./50% RH, with and without additional addition of TiPOSS and DBTL.

TABLE A

Curing characteristics of silane-terminated polymers STP 1 to STP 6

| | STP 1 FT/TFT | STP 2 FT/TFT | STP 3 FT/TFT | STP 4* FT/TFT | STP 5 FT/TFT | STP 6 FT/TFT |
|---|---|---|---|---|---|---|
| | AmSi route | | AmSi route | | Iso-Si route | |
| | MDI (MDI way) | | IPDI (IPDI way) | | 3-(Trimethoxysilyl)propyl isocyanate | |
| Viscosity of the STPs mPas | 15 000 | 43 000 | 11 000 | 17 000 | 8900 | 9100 |
| No further addition of cat.* | 10 h/48 h | 3.5 h/6 h | 24 h/48 h | 10 h/48 h | 6 h/12 h | 60 min/3.5 h |
| +0.25% by weight TiPOSS (=2500 ppm) | 90 min/2.5 h | 25 min/1.5 h | 3 h | 45 min/2 h | 50 min/2.5 h | 20 min/1.5 h |
| +0.25% by weight DBTL (=2500 ppm) | 80 min/2.5 h | 20 min/1.5 h | 1.5 h/3 h | 3 h | 30 min/1.5 h | 50 min/2.5 h |

*From comparison of the reaction regime at 48° C.
STP 1, 3, 5 = with TiPOSS; STP 2, 4, 6 = with DBTL

Conclusion

The distinctly prolonged fibre time or tack-free time for the silane-terminated polymers prepared with TiPOSS (STP 1, STP 3 and STP 5, no further addition of catalyst, marked area of the table) indicate that it was possible to distinctly increase stability with respect to ingress of water (humidity, residual moisture, formulation raw materials, etc.) compared to the compounds prepared with DBTL.

The resulting advantages thereof are briefly elucidated below:

As a result, the processor has the benefit of processing a less hydrolysis-sensitive hybrid polymer. This means specifically:
1. The residual moisture of other components and raw materials in the formulation of sealant recipes is less problematic,
2. elevated processing reliability is additionally obtained,
3. storage stabilities of the composition according to the invention are improved and
4. less water scavenger (e.g. VTMO—which is harmful if inhaled according to H332 and highly flammable according to H225 of the EU-GHS classification and identification) is required for the stabilization of hybrid polymers and for sealant recipes.
5. It is possible to use a lower level of tin-containing catalysts, and preferably to dispense entirely with tin-containing catalysts.
6. General reduction in the amount of catalyst required.

Example II

The present invention also relates to a composition and to a process for producing polyurethane prepolymers and polyurethane systems based on polyols, di- or polyisocyanates and a TiPOSS-based catalyst.

TiPOSS-based catalysts that are preferred in accordance with the invention are those disclosed in EP 2 989 155 B1 and EP 2 796 493 A1. The disclosure of these documents is fully incorporated with regard to the catalysts. Particular preference is given to the catalysts (metallosilsesquioxane) according to Claim 5 of EP 2 989 155 B1.

The study of the activity of heptaisobutyl POSS-titanium (IV) ethoxide (TiPOSS) for the formation of polyurethane compounds was conducted by way of example in comparison with dibutyltin dilaurate (DBTDL) and tin(II) 2-ethylhexanoate (tin octoate) in various unfoamed and foamed polyurethane systems. Particular attention was paid to the effect on the preparation of the silylated polyurethanes (SPUR) by the IPDI route. The model formulations from the CASE application sectors, soft foam and flexible foam (slabstock foam), were examined here with regard to their curing characteristics at room temperature (23° C./50% RH) using various polyols and isocyanates with the same catalyst content of TiPOSS and DBTDL or tin octoate. For simplification, the studies have been conducted under the assumption that a complete stoichiometric reaction (index 100) can take place between isocyanate and polyol. In principle, the studies are also applicable to the preparation of prepolymers. The catalytic activity of the catalysts examined was determined by the determination and comparison of cream time, fibre time and tack-free time.

1.) Study of TiPOSS/DBTDL in Unfoamed Polyurethane Formulations a) Propylene Glycol Polyols The polyol A component consisted of a polypropylene diol and the TiPOSS catalyst in the form of a 20% solution in diisononyl phthalate (DINP). For comparison of catalytic activity, a corresponding identical polyol A component was prepared using DBTDL. The amount of catalyst was 0.2 percent by weight in each case (neglecting the amount of solvent). In order to study the influence of molecular weight, the molecular weight was additionally varied from low (MW~2000) to high (MW~18 000), since it can be assumed that the reactivity of polypropylene polyols that are of limited reactivity in any case will decrease further with rising molecular weight, and hence differences in reactivity will be particularly readily observable.

The polypropylene polyols tested were accordingly those with MW~2000 (Rokopol D2002, PCC Rokita), MW~8000 (Rokopol LDB 8000), MW~12 000 (Rokopol LDB 12000) and MW~18 000 (Rokopol LDB 18000).

The crosslinker components used were the isocyanates P-MDI (Voranate M230, Dow), IPDI (Wanate IPDI, DKSH) and HDI trimer isocyanurates (Vestanat HT2500/100). The reaction between polyol A and isocyanate B component was effected by stirring the two components at 1000 rpm with a conventional propeller stirrer for 10 s. After the stirring process had ended, the resultant reaction mixture was cast into slabs of thickness~6 mm (10 g). The curing characteristics were determined from the cream time, fibre time and tack-free time.

It was found that the TiPOSS-catalysed curing of polyurethane at room temperature is significantly accelerated using the polypropylene polyols described compared to the corresponding DBTDL-catalysed crosslinking. The acceleration of the reaction, according to the combination of polyol and isocyanate examined, is between a factor of 2 and a factor of 100. Viewed overall, the factor of reaction acceleration when TiPOSS is used particularly surprisingly increases for the HDI trimer of isocyanurate used, and to a lesser degree for IPDI.

Conclusion for SPUR Methodology:

Since the reaction between the DMC polyols and IPDI isocyanate is the crucial reaction for the commercial preparation of SPUR (hybrid polymers), this finding is of great significance. Since we are already able to establish a considerable increase in reaction at room temperature and with 1:1 stoichiometry, it can be expected that, under the customary conditions of SPUR prepolymer preparation, it is possible to work with considerably smaller amounts of catalyst (⅕ to ⅒) and/or a lower temperature (<80° C.) and/or shortening of the reaction time. Since the formation of by-products in this preparation leads to an unwanted increase in viscosity, a distinct improvement in the reaction regime and product quality is thus to be expected.

With regard to the ever-increasing economic significance of the SPUR products, the use of the TiPOSS catalyst is expected to lead both to a cost benefit over tin catalysts and to a product benefit.

a) Propylene Glycol Polyols, Ethylene Glycol-Tipped

In order to assess whether these observations are also applicable to more reactive polyether polyols, by way of example, polyether polyols with MW~4000 and f=2 and MW~4850 and f=3 tipped with ethoxy groups at the termini were examined. It has been found that the differences in reactivity of the polyol systems catalysed with TiPOSS and DBTDL are smaller in the case of use of reactive polyether triol. Here too, it is again observed that the acceleration in reactivity of the crosslinking by TiPOSS is particularly effective for the HDI trimer.

2.) Study of the Activity of TiPOSS/DBTL in Silane-Terminated Polyurethanes

The speed of fibre formation and curing in silane-terminated polyurethanes was determined on 6 mm SPUR slabs that had been produced by mixing the silane-terminated polyurethanes with 0.2 percent by weight each of TiPOSS and DBTL (each in solution, 20% in DINP). The mixing was effected with exclusion of air in an argon inert gas atmosphere with a conventional propeller stirrer. The mixed material was cured at 23° C./50% RH.

3.) Study of the Activity of TiPOSS/DBTDL in Flexible Polyurethane Foam Formulations The polyol A component consisted of a reactive, ethoxy group-tipped polyether triol (Rokopol M 5020, f=3), water and the TiPOSS catalyst, in the form of a 20% solution in diisononyl phthalate (DINP). For comparison of catalytic activity, a corresponding identical polyol A component was prepared using DBTDL. The amount of catalyst was 0.2 percent by weight in each case (neglecting the DINP solvent). By way of comparison, the reaction was conducted using a less reactive polypropylene polyol (Rokopol D 2002, f=2).

The crosslinking component used was the isocyanate P-MDI (Voranate M230). The reaction between polyol A component and isocyanate B component was effected by stirring the two components at 2500 rpm with a conventional propeller stirrer for 10 s. The reaction was stoichiometric. After the stirring process had ended, the reaction mixture obtained (20 g) was poured into cups. The curing characteristics were determined from the cream time and tack-free time.

It was found that the activity of TiPOSS when using ethoxylated polyols is comparable to that of DBTDL. By contrast, the curing process in the case of the formulation made from a pure polypropylene polyol is more significantly accelerated by TiPOSS.

4.) Study of the Activity of TiPOSS/Tin Octoate in a Slabstock Polyurethane Foam Formulation The polyol A component consisted of a standard polyester polyol based on Desmophen 2200 B, an amine catalyst (N,N-dimethylpiperazine and N,N-dimethylhexadecylamine), cell stabilizers, water and the TiPOSS catalyst, in the form of a 20% solution in DINP. For comparison of catalytic activity, a corresponding identical polyol A component was prepared using tin octoate. The amount of TiPOSS and tin octoate catalyst was 0.03 percent by weight in each case.

The crosslinking component used was the isocyanate Desmodur T65 and a prepolymer having an NCO content of about 12%. The reaction was effected in a stoichiometric ratio (index 100). The reaction between polyol A and isocyanate B components was effected by stirring the two components at 1000 rpm with a Visco Jet stirrer unit for 10 s. After the stirring process had ended, the resultant reaction mixture (~400 g) was poured into a 2 L wooden box, and the curing characteristics were determined from the cream time and tack-free time.

It was found that the activity of TiPOSS is comparable to that of tin octoate. The resultant foams from the reaction with TiPOSS have lower density; strength properties and indentation hardness are correspondingly lower.

5.) Overall Conclusion/Applications a) Use of TiPOSS in the Preparation of SPUR Prepolymers The significant increase in reaction described in the reaction between the DMC polyols and IPDI can be used for the commercial production of SPUR (hybrid polymers). It can be expected here that it will be possible to use considerably smaller amounts of catalyst (⅕ to ⅒) and/or a lower temperature (<80° C.) and/or a shortened reaction time. Since, in general, the formation of by-products in this preparation leads to an unwanted increase in viscosity, a distinct improvement in the reaction regime and product quality, including lower product viscosity (very important for the formulator), is thus possible.

b) Preparation of KOH-Based PU Prepolymers with TiPOSS

The formation of prepolymers obtained from the reaction of KOH-based polyols and aliphatic and aromatic isocyanates can be brought about with considerably smaller amounts of TiPOSS catalyst (⅕ to ⅒) and/or a lower temperature (<80° C.) and/or a shortened reaction time. Since the formation of by-products in this preparation leads to an unwanted increase in viscosity, a distinct improvement in the reaction regime and product quality can thus be assumed.

c) Use of TiPOSS in 2-Component Clear Encapsulating Systems and PU Varnishes Based on HDI and Other Aliphatic Isocyanates Use of TiPOSS as catalyst increases the curing rate in 2-component polyurethane clear encapsulation systems and PU varnishes. The increase in molecular weight distinctly improves the mechanical properties of the varnishes and encapsulating compounds.

d) TDI Foams/Use of TiPOSS in the Production of Slabstock Foams

In the production of TDI-based slabstock foams, through use of TiPOSS as catalyst, it is possible to dispense with the use of tin compounds that are harmful to health—as in all other applications mentioned in 5.). There is no loss here in product quality.

e) FIPFG (Foamed in Place Foam Gaskets)—Sealant Foams

The production of 2-component polyurethane systems for the FIPFG process based on TiPOSS-catalysed curing is particularly advantageous since the curing process is accelerated by the higher reactivity of TiPOSS compared to DBTL. Polyurethane products can additionally be produced without tin compounds that are harmful to health, which is particularly important for the production of sealant materials in the medical sector, kitchen applications, etc.

f) Use of TiPOSS in Moisture-Curing 1-Component Isocyanate-Terminated Prepolymers The curing of 1-component isocyanate-terminated prepolymers can be accelerated by the use of TiPOSS. It is possible to dispense with the use of tin compounds that are harmful to health. This is of particular relevance when these prepolymers are used as adhesives for customary floor coverings, since it is possible to avoid possible contamination, even if only by small amounts of tin, via the skin of the foot.

6.) Specific Embodiments

Studies on the Activity of Heptaisobutyl-POSS-Titanium (IV) Ethoxide TiPOSS in Comparison to DBTL

TABLE 1

| Isocyanate | Catalyst | Polyols from the KOH-catalyzed reaction f = 2, MW = 2000, PO f = 2, MW = 4000, PO, EO tipped f = 3, MW = 4800, PO, EO tipped |
|---|---|---|
| P-MDI* | TiPOSS 0.2% vs. DTBL 0.2 % | + |
| P-MDI | TiPOSS 0.2% vs. DTBL 0.2 % | ++ |

TABLE 2

| SPUR | Catalyst | activity |
|---|---|---|
| Silylated Polyurethane (nonaromatic) | TiPOSS 0.2% vs. DTBL 0.2 % | + |

List of Abbreviations

Coatings, Adhesives, Sealants, Elastomers (CASE)
Diisononyl phthalate (DINP)
Dibutyltin dilaurate (DBTDL or DBTL)
Tin(II) 2-ethylhexanoate (tin octoate)
Silylated polyurethanes/silylated polyurethane resins (SPUR)
Heptaisobutyl POSS-titanium(IV) ethoxide (TiPOSS)
Dimethylcyclosiloxane (DMC)
Polyurethane (PU)
Potassium hydroxide (KOH)
FIPFG (foamed in place foam gaskets—gasket foams)
Titanium (Ti)
Polyhedral oligomeric silsesquioxane (POSS)

Embodiments, Especially for Example II

1. Process for preparing prepolymers by reacting a component A with a component B in the presence of a catalyst in a liquid medium, where component A is a polyol and component B a crosslinking component (crosslinker), characterized in that component A is in deficiency relative to component B, and component A and component B are especially used in a ratio of at least 1:1.05, preferably of 1:2.2, and the catalyst is selected from the group of the tin-free polyhedral oligomeric metallosilsesquioxanes, preferably from the group of the titanium(IV) polyoctahedral silsesquioxanes.
2. Process for preparing polyurethane by combining a two-component system having a component A and a component B in the presence of a catalyst in a liquid medium, where component A is a polyol and component B a crosslinking component (crosslinker), characterized in that components A and B are present separately, and the catalyst has preferably been formulated with component A, and components A and B are present in a ratio of 1.2:1.0 up to 1.0:1.2.
3. Process for producing polyurethane systems, characterized in that the prepolymers are prepared or preparable according to either of Embodiments 1 and 2 using a catalyst selected from the group of the tin-free polyhedral oligomeric metallosilsesquioxanes, preferably from the group of the titanium(IV) polyoctahedral silsesquioxanes.
4. Process according to Embodiment 3, characterized in that the prepolymers are functionalized before the reaction with aminosilanes.
5. Process according to any of the preceding embodiments, characterized in that auxiliaries are added.
6. Process according to Embodiment 5, characterized in that the auxiliaries are selected from the group consisting of water, cell stabilizers, amine catalysts, fillers, adhesion promoters, moisture scavengers, plasticizers, UV stabilizers, thixotropic agents, or combinations thereof, preferably with one or more additives being one or more silanes.
7. Process according to Embodiment 6, characterized in that the amine catalyst may be N,N-dimethylpiperazine and/or N,N-dimethylhexadecylamine or a mixture thereof.
8. Process according to any of the preceding embodiments, characterized in that the catalyst is $R^1$—POSS-titanium(IV) ethoxide (TiPOSS) where $R^1$ is an alkyl, allyl or aryl radical or mixtures thereof, and $R^1$ is preferably a heptaisobutyl.

9. Process according to any of the preceding embodiments, characterized in that the catalyst content is between 0.0001% and 5% by weight, preferably between 0.001% and 2% by weight, further preferably between 0.01% and 0.3% by weight, especially preferably 0.2, more especially preferably 0.03.
10. Process according to any of the preceding embodiments, characterized in that the crosslinker is an isocyanate.
11. Process according to Embodiment 10, characterized in that the isocyanate is aromatic and/or aliphatic, preferably methylene diphenyl isocyanates (MDI) and/or isophorone diisocyanate (IPDI) and/or a hexamethylene diisocyanate trimer (HDI trimer) or a mixture thereof.
12. Process according to any of the preceding embodiments, characterized in that the polyol is a polyoxypropylene diol, preferably having a molar mass between 2000 g/mol and 18 000 g/mol, more preferably having a molar mass between 12 000 g/mol and 18 000 g/mol.
13. Process according to any of the preceding Embodiments 1 to 11, characterized in that the polyol is an ethoxylated polyol, preferably a polyether triol tipped with ethoxy groups, and more preferably has a molar mass between 2000 g/mol and 4850 g/mol.
14. Process according to any of Embodiments 1 to 11, characterized in that the polyol is a polyester polyol, preferably Desmophen 2200 B.
15. Process according to any of the preceding embodiments, characterized in that the polyol comes from a KOH- and/or DMC-catalysed reaction.
16. Process according to any of the preceding embodiments, characterized in that the liquid medium is an organic solvent, preferably diisononyl phthalate (DINP).
17. Process according to any of the preceding embodiments, characterized in that it is tin-free.
in the field of adhesives and sealants.

The invention claimed is:
1. Process for preparing prepolymers by reacting a component A with a component B in the presence of a catalyst selected from the group of the tin-free polyhedral oligomeric metallosilsesquioxanes, in a liquid medium, where component A is a polyol and component B is isophorone diisocyanate, characterized in that component A is in deficiency relative to component B, wherein the catalyst content is between 0.001% and 0.03% by weight and the process is conducted at temperatures of 20° C. to 80° C.
2. The process according to claim 1, wherein component A and component B are used in a ratio of 1:2.2.
3. The process according to claim 1, wherein the catalyst is selected from the group of titanium (IV) polyoctahedral silsesquioxanes.
4. The process according to claim 1, wherein the catalyst is R1-POSS-titanium (IV) ethoxide, where R1 is heptaisobutyl.
5. Process for producing a composition comprising at least one silylated polymer, comprising the following steps:
(i) synthesizing a polymer by combining component A, which is at least one hydroxy-functionalized polymer selected from the group consisting of polyoxyalkylene diols, polyoxyalkylene triols, and mixtures thereof, with component B, which is isophorone diisocyanate using a metal-siloxane-silanol (ate) compound according to structure (IV), which is a metal silsesquioxane

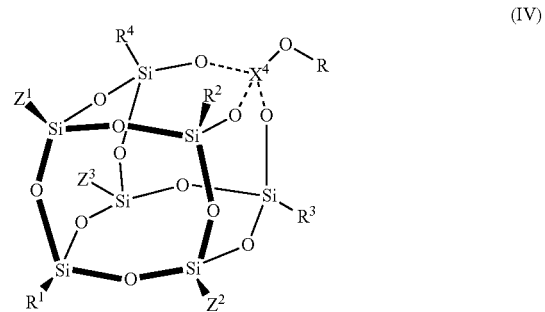

where
$X^4$ is selected Zn, Ti, Zr, Hf, V, Fe, Sn and Bi, and
$X^4$ is joined to OR where R is selected from the group consisting of —H, -methyl, -ethyl, -propyl, -butyl, -octyl, -isopropyl, and -isobutyl,
$Z^1$, $Z^2$ and $Z^3$ are each independently C1- to C20-alkyl, C3- to C8-cycloalkyl, C2- to C20-alkenyl and C5- to C10-aryl, and
$R^1$, $R^2$, $R^3$ and $R^4$ are each independently C1- to C20-alkyl, C3- to C8-cycloalkyl, C2- to C20-alkenyl, and C5- to C10-aryl,
wherein component A is in deficiency relative to component B,
(ii) optionally admixing the polymer from step (i) with a catalyst selected from dibutyltin dilaurate or a metal-siloxane-silanol (ate) compound selected from heptaisobutyl POSS-titanium (IV) ethoxide, heptaisobutyl POSS-tin (IV) ethoxide and mixtures thereof, wherein the process is carried out at temperatures of at least 20° C. and at most 80° C. and the amount of catalyst is in the range from 20 to 200 ppm and wherein the polymer obtained in each case from step (i) was reacted with an aminosilane selected from
at least one aminosilane of the general structure (VIII) and a mixture thereof,

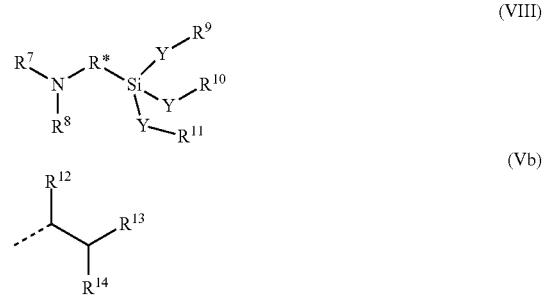

where
$R^7$ is H,
$R^8$ is H, an optionally substituted straight-chain or branched C1- to C25-alkyl group, an optionally substituted straight-chain or branched C2- to C25-alkenyl group or an optionally substituted C4- to C18-cycloalkyl group or an optionally substituted C4- to C18-aryl group, or a radical of the general structure (Vb),
$R^*$ is absent or an optionally substituted straight-chain or branched C1- to C25-alkyl group or an optionally substituted C4- to C18-cycloalkyl group or an optionally substituted C4- to C18-aryl group and, when $R^*$ is absent, the silicon atom is bonded directly to the nitrogen atom, R¹² and R¹⁴ are each independently H or a radical selected from the group consisting of —R¹⁵, —COOR¹⁵ and —CN, R¹³ is H or a radical selected from the group consisting of —CH₂—COOR¹⁵, —COOR¹⁵, —CONHR¹⁵, —CON(R¹⁵)₂, —CN, —NO₂, —PO(OR¹⁵)₂, —SOR¹⁵ and —SO₂OR¹⁵, R¹⁵ is a hydrocarbyl radical having 1 to 20 carbon atoms and optionally having at least one heteroatom, R⁹, R¹⁰, R¹¹ are independently H, an optionally substituted straight-chain or branched C1- to C5-alkyl group, an optionally substituted straight-chain or branched C2- to C10-alkenyl group or an optionally substituted C4- to C14-cycloalkyl group or an optionally substituted C4- to C14-aryl group, and each Y is independently either O or a direct bond of the silicon atom to the respective R⁹, R¹⁰ or R¹¹ radical.

6. The process according to claim 5, wherein component A and component B are used in a ratio of 1:2.2.

7. The process according to claim 5, wherein X⁴ is selected from the group consisting of Ti and Sn.

8. The process according to claim 5, wherein Z1, Z2 and Z3 are selected from the group consisting of methyl, ethyl, propyl, isopropyl, butyl, isobutyl, hexyl, heptyl, octyl, vinyl, allyl, butenyl and phenyl, and benzyl, and R1, R2, R3 and R4 are selected from the group consisting of methyl, ethyl, propyl, isopropyl, butyl, isobutyl, hexyl, heptyl, octyl, vinyl, allyl, butenyl and phenyl, and benzyl.

9. The process according to claim 5, wherein the metal-siloxane-silanol (ate) compound is a metal silsesquioxane of the structure (IVb)

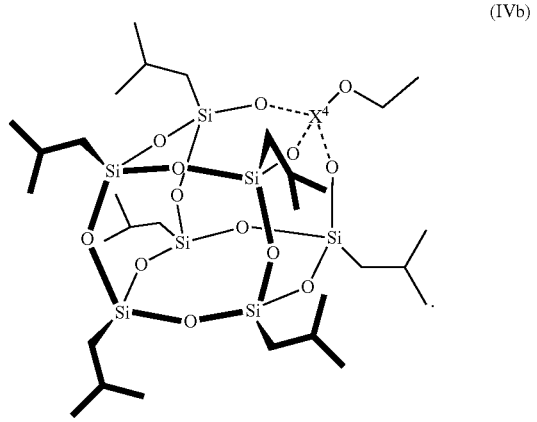

(IVb)

where X⁴ is selected from the group consisting of Zn, Ti, Zr, Hf, V, Fe, Sn and Bi.

10. The process according to claim 5, wherein the metal-siloxane-silanol (ate) compound is a metal silsesquioxane of the structure (IVb) where X⁴ is selected from the group consisting of Ti and Sn.

11. The process according to claim 5, comprising the steps of:
(i) synthesizing a polymer at a temperature of <60° C by combining at least one hydroxy-functionalized polymer selected from the group consisting of hydroxy-functionalized polymers selected from the group consisting of polyoxyalkylene diols, polyoxyalkylene triols, and mixtures thereof having number-average molar masses (Mn) of 500-35 000 g/mol, and mixtures thereof with isophorone diisocyanate, using heptaisobutyl POSS-titanium (IV) ethoxide, (ii) optionally admixing the polymer from step (i) with a catalyst selected from dibutyltin dilaurate and heptaisobutyl POSS-titanium (IV) ethoxide, heptaisobutyl POSS-tin (IV) ethoxide and mixtures thereof.

12. The process according to claim 5, wherein the at least one aminosilane is selected to be of the general structure (VIII) and a mixture thereof,

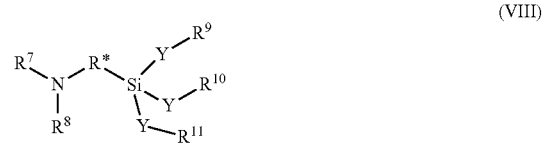

(VIII)

where

R⁸ is H, an optionally substituted straight-chain or branched C1- to C10-alkyl group, an optionally substituted straight-chain or branched C2- to C10-alkenyl group or an optionally substituted straight-chain or branched C2- to C10-alkynyl group, an optionally substituted C4- to C10-cycloalkyl group or an optionally substituted C4- to C10-aryl group or a succinic acid derivative of the general structure (Vb), R* is absent or an optionally substituted straight-chain or branched C1- to C20-alkyl group or an optionally substituted C4- to C12-cycloalkyl group or an optionally substituted C4- to C12-aryl group, and, when R* is absent, the silicon atom is bonded directly to the nitrogen atom, R⁹, R¹⁰, R¹¹ are independently H, an optionally substituted straight-chain or branched C1- to C5-alkyl group, an optionally substituted straight-chain or branched C2- to C10-alkenyl group or an optionally substituted C4- to C14-cycloalkyl group or an optionally substituted C4- to C14-aryl group, and Y in Y—R⁹ and Y—R¹⁰ are O and the Y in Y—R¹¹ is either O or a direct bond of the silicon atom to the respective R¹¹ radical.

13. The process according to claim 12, wherein the aminosilane of the general structure (VIII) is selected from the group of N-[3-(trimethoxysilyl)methyl]butylamine, N-[3-(triethoxysilyl)methyl]butylamine, N-[3-(trimethoxysilyl)ethyl]butylamine, N-[3-(triethoxysilyl)ethyl]butylamine, N-[3-(trimethoxysilyl) propyl]butylamine, N-[3-(triethoxysilyl) propyl]butylamine, N-[3-(trimethoxysilyl) butyl]butylamine, N-[3-(triethoxysilyl)butyl]butylamine, N-[3-(trimethoxysilyl) pentyl]butylamine, N-[3-(triethoxysilyl) pentyl]butylamine, N-[3-(trimethoxysilyl) hexyl] butylamine, N-[3-(triethoxysilyl) hexyl]butylamine, 3-aminopropyltrimethoxysilane, 3-aminopropyltriethoxysilane, N-cyclohexyl-3-aminopropyltrimethoxysilane, N-cyclohexyl-3-aminopropyltriethoxysilane, N-(3-trimethoxysilylpropyl)aminosuccinic acid diethyl ester, N-(3-triethoxysilylpropyl)aminosuccinic acid diethyl ester and a mixture thereof.

14. The process according to claim 5, comprising the following steps:
(i) synthesizing a polymer at a temperature of <60° C. by combining at least one hydroxy-functionalized polymer selected from the group consisting of polypropylene diols, polyester polyols, and mixtures thereof, with isophorone diisocyanate using heptaisobutyl POSS-titanium (IV) ethoxide, (ii) reacting the polymer obtained from step (i) with an aminosilane selected from the group of N-[3-(triethoxysilyl) propyl]butylamine, or N-[3-(trimethoxysilyl) propyl]butylamine and mixtures thereof to give the silylated polymer (SiP), (iii) optionally admixing the silylated polymer from step (i) or (ii) with a further catalyst selected from dibutyltin dilaurate, heptaisobutyl POSS-titanium (IV) ethoxide, heptaisobutyl POSS-tin (IV) ethoxide and mixtures thereof.

15. The process according to claim 14, wherein the at least one hydroxy-functionalized polymer selected from the group consisting of polypropylene diols, polyester polyols, and mixtures thereof, has a number-average molar mass (Mn) of 500-35 000 g/mol.

* * * * *